(12) United States Patent
Gonzalez et al.

(10) Patent No.: US 7,390,847 B2
(45) Date of Patent: Jun. 24, 2008

(54) POLYMER DERIVATIVES FOR THE TREATMENT OF METALS

(75) Inventors: Monica Fernandez Gonzalez, Heidelberg (DE); Hans-Ulrich Jäger, Neustadt (DE); Peter Neumann, Mannheim (DE); Helmut Witteler, Wachenheim (DE)

(73) Assignee: BASF SE, Ludwigshafen (DE)

( * ) Notice: Subject to any disclaimer, the term of this patent is extended or adjusted under 35 U.S.C. 154(b) by 47 days.

(21) Appl. No.: 10/500,306

(22) PCT Filed: Dec. 27, 2002

(86) PCT No.: PCT/EP02/14784

§ 371 (c)(1),
(2), (4) Date: Jan. 12, 2005

(87) PCT Pub. No.: WO03/056061

PCT Pub. Date: Jul. 10, 2003

(65) Prior Publication Data

US 2005/0121114 A1    Jun. 9, 2005

(30) Foreign Application Priority Data

Dec. 27, 2001 (DE) .................................. 101 63 892

(51) Int. Cl.
*C04B 24/30* (2006.01)
*C04B 103/32* (2006.01)
*C08L 71/00* (2006.01)
*C08J 3/00* (2006.01)
*C08K 3/20* (2006.01)
*C23C 22/83* (2006.01)
*C09K 3/00* (2006.01)
*B05D 7/14* (2006.01)
*B01D 5/00* (2006.01)

(52) U.S. Cl. ..................... 524/406; 524/841; 524/541; 524/594; 524/595; 524/596; 525/390; 525/397; 525/480; 525/505; 427/486; 427/372.2; 427/385.5; 427/388.1; 427/388.2; 148/251; 148/257; 148/265; 252/389.2

(58) Field of Classification Search .................. 524/406, 524/841, 541, 594; 525/390, 397, 480, 505; 427/372.2, 385.5, 388.1, 486, 379
See application file for complete search history.

(56) References Cited

U.S. PATENT DOCUMENTS 2,993,806 A * 7/1961 Fisher et al. ................. 428/216

(Continued)

FOREIGN PATENT DOCUMENTS

EP         828 197          3/1996
JP         2000-327387    * 11/2000
WO       WO 03056061 A2 * 10/2003

OTHER PUBLICATIONS

Patent Abstracts of Japan 200038540 Aug. 2, 2000.

*Primary Examiner*—Duane Smith
*Assistant Examiner*—Ives Wu
(74) *Attorney, Agent, or Firm*—Novak Druce + Quigg LLP

(57) ABSTRACT

A composition for the treatment of metal surfaces and for the deposition of metals or metal alloys on plastics surfaces contains
a) at least one polymer as component A, composed of the structural element (1)

and at least three structural elements selected from the group consisting of

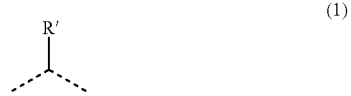

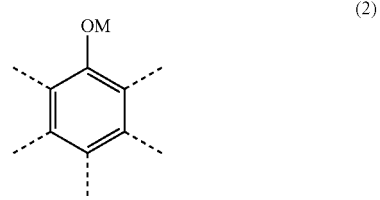

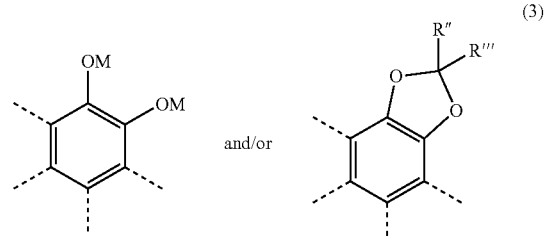

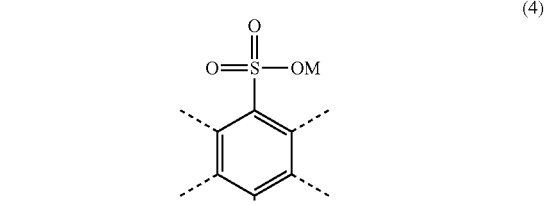

b) water or another solvent which is suitable for dissolving, dispersing, suspending or emulsifying the polymer, as component B;
c) if required, surface-active compounds, dispersants, suspending media and/or emulsifiers as component C.

In a process for the treatment of a metal surface and a process for the deposition of metals or metal alloys on a plastics surface, the metal or plastics surface is brought into contact with a polymer (component A). Furthermore, polymers (component A) are used for the treatment of metal surfaces and for the deposition of metals or metal alloys on a plastics surface, and polymers composed of special components A'a, A'b and A'c.

8 Claims, No Drawings

U.S. PATENT DOCUMENTS 5,266,410 A * 11/1993 Lindert et al. ............... 428/461
5,361,616 A * 11/1994 Takahashi et al. .............. 72/46
5,420,015 A *  5/1995 Wuerch ....................... 435/12
5,494,535 A *  2/1996 Keller et al. ................. 148/251
5,753,316 A *  5/1998 Brent et al. .................. 427/486
6,130,289 A * 10/2000 Kucera ........................ 524/841
6,866,797 B1* 3/2005 Martin et al. ........... 252/389.23

* cited by examiner

POLYMER DERIVATIVES FOR THE TREATMENT OF METALS

The present invention relates to compositions for the treatment of metal surfaces, processes for the anticorrosion treatment of metal surfaces and the use of polymers for the treatment of metal surfaces. The present invention furthermore relates to a composition and a process for depositing metals or metal alloys on plastics surfaces.

The corrosion of metals is a problem during the manufacture, processing and use of articles which contain metals. Protective films and corrosion inhibitors are therefore used for slowing down or preventing the corrosion. While a protective film is applied permanently to the metal, a corrosion inhibitor is preferably added to substances, in particular liquid mixtures,-which, when in contact with the metal, would cause or accelerate corrosion. Both the protective films and the corrosion inhibitors may be present in the form of polymers or contain polymers. Of particular interest are compositions in which no toxic chromate need be used. Such compositions are known from the prior art.

EP-A 0828 197 relates to formulations for removing photoresists and etching residues from semiconductor surfaces, which contain water, at least one amino compound and a corrosion inhibitor. The corrosion inhibitor is selected from quaternary ammonium silicates and oligomeric condensates of a catechol, an aldehyde or ketone and, if required, a phenolic compound, preferably a pyrocatechol/formaldehyde oligomer.

U.S. Pat. No. 6,130,289 relates to aqueous phenol resin dispersions, the phenol resin being obtained from the reaction of a phenol resin precursor, preferably a resol, and a modifier which has an ionic group, preferably a sulfonate group, and a group reactive with the phenol resin precursor, preferably a hydroxyl or hydroxyalkyl group. These phenol resin dispersions are suitable for the coating of metal surfaces.

Owing to the importance and range of use of corrosion inhibitors and protective films for metal surfaces, there is a considerable need for protective films and corrosion inhibitors whose property spectra, such as adhesion to the metal surface, inhibition effect and hydrophobic character, meet the high requirements which the treated metal surfaces have to meet. Furthermore, the components of the protective films or corrosion inhibitors should be readily available in sufficient amount and should be very economical.

It is an object of the present invention to provide compositions for the surface treatment of metals which results in at least one of the following improvements to the metal surface: improved corrosion protection, improved adhesion for subsequent coatings (e.g. finishing or metal deposition), passivation or smoother surfaces (in the case of polishing, pickling or electropolishing). It is a further object of the present invention to provide processes for the surface treatment of metals and polymers which are suitable as components for the novel compositions and meet said requirements. Furthermore, the present invention is intended to provide additives for the deposition of metals. Moreover, it is intended to provide compositions and processes for deposition of metals or metal alloys on plastics surfaces.

We have found that this object is achieved by a composition for the treatment of metal surfaces, comprising:

a) at least one polymer as component A, composed of the structural element (1)

and at least three structural elements selected from the group consisting of

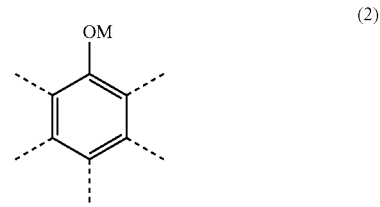

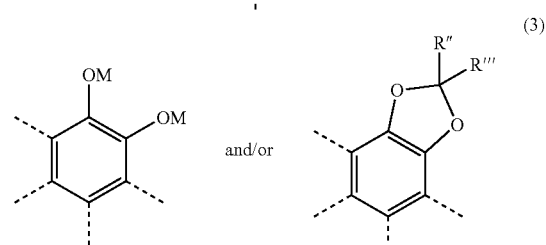

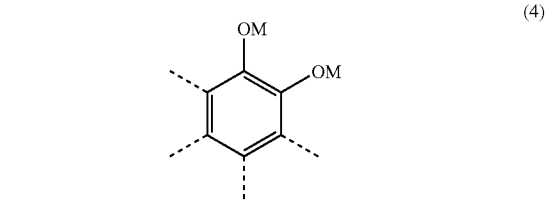

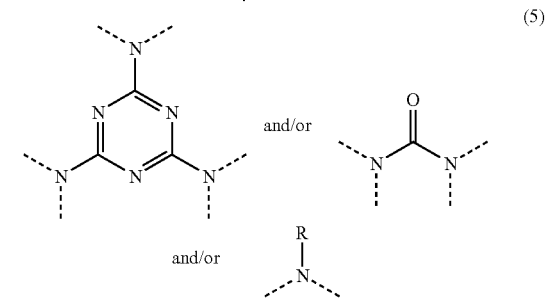

where
in structural element (1)
R' is hydrogen or an alkyl, cycloalkyl, aryl, aralkyl or alkaryl radical of less than 31 carbon atoms which may be unsubstituted or substituted by alkyl radicals or heteroatom-containing groups, preferably chloro, hydroxyl or amino groups, or may be interrupted by heteroatoms, preferably nitrogen or oxygen, or may contain double bonds; R' is preferably hydrogen or $C_{1-6}$-alkyl, $C_{1-6}$-hydroxyalkyl, $C_{1-6}$-aminoalkyl or $C_{6-10}$-aryl,
in structural element (3)
R'' and R''' are any desired radicals having a molecular weight of <200 g/mol, preferably independently of one another hydrogen or alkyl, cycloalkyl, aryl, aralkyl or alkaryl radicals, particularly preferably hydrogen or $C_{1-6}$-alkyl- or $C_{6-10}$-aryl radicals, in structural elements (2), (3) and (4)

M, in each case independently of one another, are hydrogen or a cation, preferably an alkali metal cation, particularly preferably a sodium or potassium ion, or a divalent or polyvalent cation, preferably an alkaline earth metal cation or Zn, Zr, Cr, Mn, Fe, Co, Ni, Cu, Al, Ce or V, particularly preferably magnesium, calcium, zinc or manganese, if negative charges sufficient for compensation are present, and in structural element (5)

R is hydrogen or an alkyl, cycloalkyl, aryl, aralkyl or alkaryl radical which may be unsubstituted or substituted by alkyl radicals or heteroatom-containing groups, preferably chloro, hydroxyl or amino groups, or may be interrupted by heteroatoms, preferably nitrogen or oxygen; R is preferably hydrogen or $C_{1-6}$-alkyl, $C_{1-6}$-hydroxyalkyl, $C_{1-6}$-aminoalkyl or $C_{6-10}$-aryl;

b) water or another solvent which is suitable for dissolving or for dispersing, suspending or emulsifying the polymer (component A), as component B;

c) if required, surface-active compounds, dispersants, suspending media and/or emulsifiers, as component C.

This novel composition can be used in all metal treatment processes, in particular in those in which corrosion of a metal surface may occur. Such processes are, for example, the passivation, in particular phosphating, of metal surfaces, preferably in the absence of chromate, the pickling of metal surfaces, the sealing of metal surfaces and metal deposition onto metal surfaces, for example by nickel plating, galvanization, tin plating, copper plating or alloy depositions. Furthermore, the compositions may be used for the preparation of finishes or rust converters. In said processes, in particular in the passivation of metal surfaces and the deposition of metals onto metal surfaces, the compositions containing the polymer (component A) used according to the invention have a good inhibiting effect and ensure good adhesion of protective films or of a coating applied thereon (e.g. finish coat or chemically or electrochemically deposited metal layers) to the metal surface. Furthermore, the novel compositions can be used for depositing metals onto plastics surfaces, for example in the production of circuit boards.

The novel compositions are preferably corrosion-inhibiting compositions which are used in processes for the surface treatment of metals in which corrosion of the metal surface may occur or which are intended to prevent corrosion.

Suitable metal surfaces are in general technically customary materials selected from the group consisting of aluminum alloys, magnesium alloys, steel, copper, zinc, tin, nickel, chromium and technically customary alloys of these metals. Further suitable metal surfaces are noble metals, in particular gold and silver and their alloys. In general, technically customary metal coatings which can be produced chemically or electrochemically, selected from the group consisting of zinc and its alloys, preferably metallic zinc, zinc/iron, zinc/nickel, zinc/manganese or zinc/cobalt alloys, tin and its alloys, preferably metallic tin, alloys of tin which contain Cu, Sb, Pb, Ag, Bi and Zn, particularly preferably those which are used as solders, for example in the production and processing of circuit boards, and copper, preferably in the form in which it is used in circuit boards and metallized plastics parts, are furthermore suitable.

If the novel compositions are used for pickling or passivation, in particular phosphating, of metal surfaces, metal surfaces comprising zinc, aluminum, magnesium and/or alloys of these metals with one another or with other alloy components are preferred. In these cases, zinc and aluminum and alloys of these metals with other alloy components are particularly preferred.

If the novel compositions are used for depositing metals onto metal surfaces, steel surfaces are preferred in the case of galvanizing and deposition of zinc alloys and in the case of copper plating and nickel plating, and copper and steel are preferred in the case of tin plating (including tin alloys).

It is possible to use the novel composition for the treatment of metal surfaces which have not been pretreated. However, it is preferable if the metal surfaces have at least been cleaned prior to the treatment with the novel composition. The cleaning preferably comprises, inter alia, degreasing of the metal surface. Suitable cleaning and degreasing methods are known to a person skilled in the art. It is also possible to use the novel composition in a process step after a pickling or a passivation of the metal surface, for example in a coating step. The novel compositions can also be used as cleaning, pickling and polishing formulations which contain additives known to a person skilled in the art and can be used in corresponding processes.

The novel compositions may furthermore be used for depositing metals or metal alloys onto plastics surfaces. The present application therefore furthermore relates to compositions for depositing metals onto plastics surfaces, comprising:

a) at least one polymer as component A, composed of the structural element (1)

and at least three structural elements selected from the group consisting of

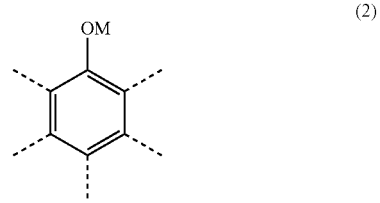

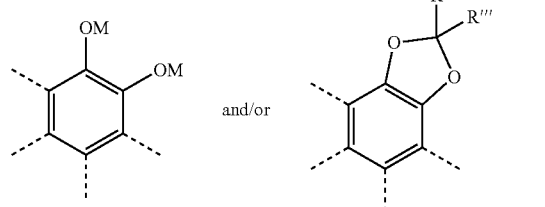

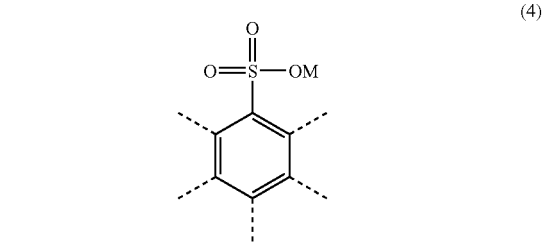

-continued

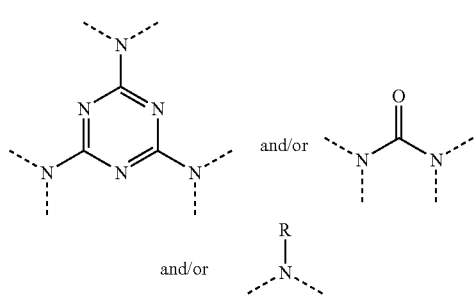

where
in structural element (1)
R' is hydrogen or an alkyl cycloalkyl, aryl, aralkyl or alkaryl radical of less than 31 carbon atoms which may be unsubstituted or substituted by alkyl radicals or heteroatom-containing groups, preferably chloro, hydroxyl or amino groups, or may be interrupted by heteroatoms, preferably nitrogen or oxygen, or may contain double bonds; R' is preferably hydrogen or $C_{1-6}$-alkyl, $C_{1-6}$-hydroxyalkyl, $C_{1-6}$-aminoalkyl or $C_{6-10}$-aryl, in structural element (3)
R" and R'" are any desired radicals having a molecular weight of <200 g/mol, preferably independently of one another hydrogen or alkyl, cycloalkyl, aryl, aralkyl or alkaryl radicals, particularly preferably hydrogen or $C_{1-6}$-alkyl- or $C_{6-10}$-aryl radicals, in structural elements (2), (3) and (4)
M, in each case independently of one another, are hydrogen or a cation, preferably an alkali metal cation, particularly preferably a sodium or potassium ion, or a divalent or polyvalent cation, preferably an alkaline earth metal cation or Zn, Zr, Cr, Mn, Fe, Co, Ni, Cu, Al, Ce or V, particularly preferably magnesium, calcium, zinc or manganese, if negative charges sufficient for compensation are present, and
in structural element (5)
R is hydrogen or an alkyl, cycloalkyl, aryl, aralkyl or alkaryl radical which may be unsubstituted or substituted by alkyl radicals or heteroatom-containing groups, preferably chloro, hydroxyl or amino groups, or may be interrupted by heteroatoms, preferably nitrogen or oxygen; R is preferably hydrogen or $C_{1-6}$-alkyl, $C_{1-6}$-hydroxyalkyl, $C_{1-6}$-aminoalkyl or $C_{6-10}$-aryl;

b) water or another solvent which is suitable for dissolving or for dispersing, suspending or emulsifying the polymer (component A), as component B;

c) if required, surface-active compounds, dispersants, suspending media and/or emulsifiers, as component C.

Compositions which are suitable for nickel-plating and copper-plating plastics surfaces, for example for copper plating in the production of circuit boards, are preferred. Plastics surfaces are prepared by industrially customary metallizing methods. The novel compositions are used for metallizing the plastic but, if required, can also be used in the pretreatment for metallizing.

In the context of the present application, compositions are to be understood as meaning both the ready-to-use compositions and concentrates. The concentrations stated below for the individual components relate to the ready-to-use compositions. However, it is known to a person skilled in the art that the concentrations of the individual components in the concentrates are correspondingly higher.

Component A

Component A is at least one polymer composed of the structural element (1)

and at least three structural elements selected from the group consisting of

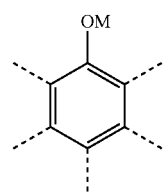

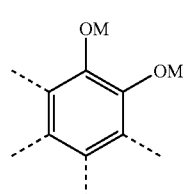

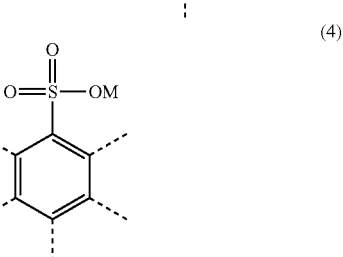

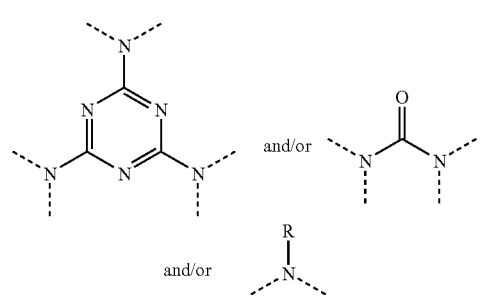

where
in structural element (1)
R' is hydrogen or an alkyl, cycloalkyl, aryl, aralkyl or alkaryl radical of less than 31 carbon atoms which may be unsubstituted or substituted by alkyl radicals or heteroatom-containing groups, preferably chloro, hydroxyl or amino groups, or may be interrupted by heteroatoms, preferably nitrogen or oxygen, or may contain double bonds; R' is preferably hydrogen or $C_{1-6}$-alkyl, $C_{1-6}$-hydroxyalkyl, $C_{1-6}$-aminoalkyl or $C_{6-10}$-aryl, in structural element (3)

R" and R''' are any desired radicals having a molecular weight of <200 g/mol, preferably independently of one another hydrogen or alkyl, cycloalkyl, aryl, aralkyl or alkaryl radicals, particularly preferably hydrogen or $C_{1-6}$-alkyl or $C_{6-10}$-aryl radicals, in structural elements (2), (3) and (4)

M, in each case independently of one another, are hydrogen or a cation, preferably an alkali metal cation, particularly preferably a sodium or potassium ion, or a divalent or polyvalent cation, preferably an alkaline earth metal cation or Zn, Zr, Cr, Mn, Fe, Co, Ni, Cu, Al, Ce or V, particularly preferably magnesium, calcium, zinc or manganese, if negative charges sufficient for compensation are present, and in structural element (5)

R is hydrogen or an alkyl, cycloalkyl, aryl, aralkyl or alkaryl radical which may be unsubstituted or substituted by alkyl radicals or heteroatom-containing groups, preferably chloro, hydroxyl or amino groups, or may be interrupted by heteroatoms, preferably nitrogen or oxygen; R is preferably hydrogen or $C_{1-6}$-alkyl, $C_{1-6}$-hydroxyalkyl, $C_{1-6}$-aminoalkyl or $C_{6-10}$-aryl.

The weight average molecular weight of the polymers used according to the invention is in general >500, preferably from 1 000 to 1 500 000 g/mol.

The polymers (component A) preferably have the following elemental composition:

C: 20-82, preferably from 30 to 80, particularly preferably from 40 to 70, % by weight, H: 2.3-12.5, preferably from 2.3 to 8, particularly preferably from 2.5 to 5.5, % by weight, N: 1-61, preferably from 1 to 20, particularly preferably from 1 to 15, % by weight, O: 2-50, preferably from 5 to 50, particularly preferably from 20 to 45, % by weight, S: 0-18.5, preferably from 0.5 to 18.5, particularly preferably from 5 to 15, % by weight, X: 0-46, preferably from 0 to 38, particularly preferably from 1 to 13, % by weight, where X is any desired chemical element, preferably one or more of the cations stated for M.

Component A is prepared in any desired manner. Suitable processes are known to a person skilled in the art. In a particularly preferred embodiment, component A is prepared by polycondensation. Suitable process conditions for a polycondensation are known to a person skilled in the art from the preparation of phenol resins, urea resins and melamine resins, which is disclosed, for example, in ULLMANN'S ENCYCLOPEDIA OF INDUSTRIAL CHEMISTRY, SIXTH EDITION, 2000 ELECTRONIC RELEASE, Chapter "Phenolic Resins", Paragraphs 3 and 4, and in U.S. Pat. No. 4,252,938 and U.S. Pat. No. 4,677,159.

For the preparation of the polymer (component A) by polycondensation, in general the following components are reacted with one another:

a) at least one aldehyde as component Aa, b) at least one aromatic compound which carries at least one OM group or one sulfo group, —SO₂OM, or both groups, as component Ab, c) if required, at least one compound selected from diphenols or polyphenols having vicinal OM groups, it being possible, if required, for the vicinal OH groups to be protected as acetal or ketal, as component Ac, where, in components Ab and Ac, M, in each case independently of one another, are hydrogen or a cation, preferably an alkali metal cation, particularly preferably a sodium or potassium ion, or a divalent or polyvalent cation, preferably an alkaline earth metal cation or Zn, Zr, Cr, Mn, Fe, Co, Ni, Cu, Al, Ce or V, particularly preferably magnesium, calcium, zinc or manganese, if negative charges sufficient for compensation are present, d) if required, at least one amino compound as component Ad, at least one of the components Ac and Ad being reacted in the preparation of the polymer (component A).

The polycondensation can be carried out in the presence of a catalyst. Suitable catalysts are known to a person skilled in the art. A catalyst selected from the group consisting of acids, preferably mineral acids and oxalic acid, and bases, preferably alkali metal or alkaline earth metal hydroxides, and salts of weak acids and bases, is preferably used.

Component Aa

Suitable aldehydes are aldehydes of the formula R'CHO, where R' is hydrogen or an alkyl, cycloalkyl, aryl, aralkyl or alkaryl radical of less than 31 carbon atoms which may be unsubstituted or substituted by alkyl radicals and/or heteroatom-containing groups, preferably chloro, hydroxyl, carboxyl or amino groups, and/or may be interrupted by heteroatoms, preferably nitrogen or oxygen, and/or may contain double bonds; R' is preferably hydrogen or $C_{1-6}$-alkyl, $C_{1-6}$-hydroxyalkyl, $C_{1-6}$-aminoalkyl or $C_{6-10}$-aryl. Aldehydes selected from the group consisting of formaldehyde, ethanal, propanal, butanal, citronellal, benzaldehyde, 2-chlorobenzaldehyde, 2-hydroxybenzaldehyde, 2-propenal, 3,3-dimethylacrolein, 4-methylbenzaldehyde, 4-(1,1-dimethylethyl)benzaldehyde, anisaldehyde, 4-chlorobenzaldehyde, 3-hydroxy-2,2-dimethylpropanal, 7-hydroxy-3,7-dimethyloctanal, n-hexanal, 2-furfural, methyl 3-methyl-4-oxo-2-butenoate, 3-methylbutanal, 2-ethylhexanal, 2-methylpropanal, 2-phenylpropionaldehyde, 3,7-dimethylocta-2,6-dien-1-al, 4-(1,1-dimethylethyl)-alpha-methylbenzpropanal, pentanal, 2-methylpentanal, 2-methyl-2-pentenal, 3-acetyloxy-2-methylpropanal, 4-acetoxy-2-methyl-2-butenal, 3-formylpinane, 4-benzyloxybenzaldehyde, 2-methyl-4,4-diacetoxy-2-butenal, 2-methyl-2-propenal, terephthaldialdehyde, 3-(4-methylphenyl)-2-methyl-2-propenal, 4-formylbenzoic acid, 3-nitrobenzaldehyde, 3-formyl-4-methyltetrahydropyran, 2-methyl-3-methylthiopropanal, methyl 2-formyl-2-methylpropionate, o-phthalaldehyde, retinal, 3-(4-methoxyphenyl)-2-methyl-2-propenal, 2,3-diphenylpropenal, methyl 3-formyl-2-methylpropionate, cinnamaldehyde, paraformaldehyde, butyraldehyde, salicylaldehyde, acrolein, crotonaldehyde and glyoxal are particularly preferably used. Hexamethylenetetramine, which is a formaldehyde derivative, can also be used as the aldehydic compound. Formaldehyde and paraformaldehyde are particularly preferably used.

The aldehyde is used in general in an amount of from 20 to 80, preferably from 40 to 60, mol %, based on the total amount of the components Aa, Ab, if required Ac and, if required, Ad.

Component Ab

Suitable aromatic compounds are preferably compounds having an aromatic $C_{6-14}$ parent structure which, in addition to at least one OM group or at least one sulfo group, —SO₂OM, or both groups, may have further radicals. Preferred further radicals are alkyl radicals, preferably $C_{1-14}$-alkyl radicals which may be unsubstituted or substituted by alkyl radicals and/or heteroatom-containing groups, preferably chloro, hydroxyl, carboxyl or amino groups, and/or may be interrupted by heteroatoms, preferably nitrogen or oxygen, and/or may contain double bonds, and heteroatom-containing radicals, such as chloro, hydroxyl, carboxyl or amino groups.

The number of further radicals is variable and depends, inter alia, on the ring size of the aromatic compound. The number of radicals in addition to an OM group or a sulfo group, —SO$_2$OM, is preferably from 1 to 5, particularly preferably from 1 to 3, very particularly preferably 1 or 2. These radicals may be arranged ortho, meta or para to the OM group or sulfo group, —SO$_2$OM.

Aromatic compounds selected from the group consisting of phenol, cresols, p-alkylphenols and p-substituted phenols, such as 4-tert-butylphenol, 4-isooctylphenol, 4-hydroxybiphenyl, 4-nonylphenol, isopentylphenol, cyclohexylphenol, dodecylphenol, cashew oil (contains phenol having C$_{14}$-alkenyl substitutents in the meta position), 2,2-bis(4-hydroxyphenyl)propane (diphenylolpropane), bisphenol A, resorcinol, hydroquinone, phenol ether, phenols having carboxyl substituents, such as phenoxyacetic acid, 4,4'-dihydroxydiphenyl sulfone, naphthalenesulfonic acid (in particular 2-naphthalenesulfonic acid), naphthol, phenolsulfonic acid (in particular 4-phenolsulfonic acid), 2-hydroxyaniline, 2-hydroxy-5-methylaniline, 1-amino-2-naphthol-4-sulfonic acid and 3-amino-4-hydroxyphenyl ethyl sulfone are particularly preferably used.

At least one compound selected from phenol, hydroquinone and resorcinol is very particularly preferably used as the aromatic compound which contains at least one OM' group. At least one compound selected from phenolsulfonic acid and naphthalenesulfonic acid is very particularly preferably used as the aromatic compound which contains at least one sulfo group, —SO$_2$OM''''.

In addition to the abovementioned sulfonic acids and phenols, their salts are also used. The salts with the cations of the following metals are preferred: alkali metals, preferably sodium or potassium, alkaline earth metals, preferably magnesium or calcium, and Zn, Zr, Cr, Mn, Fe, Co, Ni, Cu, Al, Ce or V, sodium, potassium, magnesium, calcium, zinc and manganese being particularly preferred.

Where it is used, the aromatic compound which contains at least one OM group is used in general in an amount of from 7 to 21, preferably from 10 to 15, mol %, based on the total amount of components Aa, Ab, if required Ac and, if required, Ad. If component Ac is additionally used, said amount is the sum of the amounts of component Ac and the aromatic compound which contains at least one OM group.

Where it is used, the aromatic compound which contains at least one sulfo group, —SO$_2$OM, is used in general in an amount of from 10 to 30, preferably from 15 to 25, mol %, based on the total amount of components Aa, Ab, if required Ac and, if required, Ad.

In a preferred embodiment, both at least one aromatic compound which contains at least one OM group and at least one aromatic compound which contains at least one sulfo group, —SO$_2$OM, are reacted.

Component Ac

Component Ac may be used in addition to components Aa and Ab. Suitable diphenols or polyphenols having vicinal OM groups are preferably selected from the group consisting of pyrocatechol, propyl gallate, n-octyl gallate, n-dodecyl gallate, adrenaline, methyldopamine, 3-methylpyrocatechol, dopamine, 1,2-dihydroxy-4-tert-butylbenzene, 4-(2-((3-(4-hydroxyphenyl)-1-methylpropyl)amino)ethyl)-1,2-dihydroxybenzene, 2-(3,4-dihydroxybenzyl)-2-hydrazinopropionic acid, (3,4-dihydroxyphenyl)acetic acid, (3,4-dihydroxyphenyl)acetonitrile, 3,4,5-trihydroxybenzoic acid, 3,4-dihydroxybenzoic acid, 4,5-dihydroxy-1,3-benzenedisulfonic acid, 2,3-dihydroxyquinoxaline, 4,5-dihydroxy-2,7-naphthalenedisulfonic acid, 2,3-dihydroxynaphthalene-6-sulfonic acid, ω-chloro-3,4-dihydroxyacetophenone and 3,4-dihydroxycinnamic acid.

In addition to the abovementioned vicinal diphenols or polyphenols, their salts are also used. The salts with the cations of the following metals are preferred: alkali metals, preferably sodium or potassium, alkaline earth metals, preferably magnesium or calcium, and Zn, Zr, Cr, Mn, Fe, Co, Ni, Cu, Al, Ce or V, sodium, potassium, magnesium, calcium, zinc and manganese being particularly preferred.

Suitable acetals or ketals are preferably selected from the group consisting of 1,3-benzodioxole, 2-methyl-1,3-benzodioxole, 1-(2-methyl-1,3-benzodioxol-2-yl)-2-propanone, 2-methyl-3,4-methylenedioxyhydrocinnamaldehyde, 3,4-methylenedioxyphenylacetaldehyde, butacid-(6-propylpiperonyl-butyl-diethylene glycol ether), piperonyl alcohol, piperonal, piperonylic acid and 2,2-dimethyl-1,3-benzodioxole.

Pyrocatechol is very particularly preferred.

Furthermore, compounds disclosed in T. S. Li et al., *J. Chem. Soc., Perkin Trans.* 1, 21 (1998), 3561-3564, are suitable as component Ac.

The diphenols or polyphenols having vicinal OM groups, where the vicinal OH groups can, if required, be protected as acetal or ketal, are—where these compounds are employed—used in the amounts stated under component Ab (aromatic compounds which contain at least one OM' group). The sum of the amounts of the component Ac and the aromatic compounds which contain at least one OM group and are used as component Ab in one embodiment is stated under component Ab.

Component Ad

Suitable amine compounds are preferably primary monoamines, R—NH$_2$, where R is an alkyl, cycloalkyl, aryl, aralkyl or alkaryl radical which may be unsubstituted or substituted by alkyl radicals or heteroatom-containing groups, preferably chloro, hydroxyl or amino groups, or may be interrupted by heteroatoms, preferably nitrogen or oxygen; R is preferably C$_{1-6}$-alkyl, C$_{1-6}$-hydroxyalkyl, C$_{1-6}$-aminoalkyl or C$_{6-10}$-aryl. Particularly preferably used primary monoamines are primary alkylamines (R=alkyl) and primary alkanolamines (R=alkyl which is substituted by at least one hydroxyl group).

However, compounds having a plurality of amino groups, preferably 2 to 5 amino groups, selected from the group consisting of urea and its derivatives, melamine, diethylenetriamine, triethylenetetramine, diethanolamine and triethanolamine are also suitable as amine compounds. Furthermore, secondary amines, R$_2$NH; can also be used as amine compounds, where the two radicals R, independently of one another, have the meaning stated for R. Particularly preferred secondary amines are secondary alkylamines (R=alkyl) and secondary alkanolamines (at least one R=alkyl which is substituted by at least one hydroxyl group). These compounds having a plurality of amino groups or the secondary amines are used, for example, in order to adjust the degree of crosslinking and the molecular weight of the desired polymer (component A).

Furthermore, tertiary amines R$_3$N may be used as additives, where the three radicals R, independently of one another, have the meaning stated for R. Preferably used tertiary amines are tertiary alkylamines (R=alkyl) and tertiary alkanolamines (at least one R=alkyl which is substituted by at least one hydroxyl group).

Amine compounds suitable as component Ad are selected, for example, from the group consisting of urea and its derivatives, melamine, (3-aminopropyl)amino-2-ethanol, 1-(1- naphthyl)ethylamine, 1-(3-aminopropyl)imidazole, 1-(4-methoxyphenyl)-2-(ethylamino)-propane, 1-(4-methoxyphenyl)ethylamine, 1-(4-methylphenyl)ethylamine, 1,1-dimethyl-propyn-2-ylamine, 1,1'-iminobis-2-propanol, 1,2-diaminoquinone, 1,2-ethanediamine, 1,2-propylenediamine, 1,3,5-tris-(3-dimethylaminopropyl)-sym-hexahydrotriazine, 1,3-dimethylaminouracil, 1,3-phenylenebisdiaminotriazine, 1,3-propanediamine, 1,4-diamino-2,3-dihydroanthraquinone, 1,4-diaminoanthraquinone, 1,5-diaminoanthraquinone, 1,6-hexanediamine, 1,8-octanediamine, 1-amino-2-propanol, 1-amino-4-benzoylamino, 1-butanamine, 1-cyclohexyl-2-methylaminopropane, 1-dimethylamino-2-propanol, 1-hexanamine, 1-methyl-dipropylenetriamine, 1-N-ethyl-N-(2'-hydroxyethyl)-amino-3-methylbenzene, 1-octylaamine, 1-phenylethylamine, 1-phenylpropylamine, 1-piperazinethanamine, 1-propanamine, 2-(2-(N,N-dimethylamino)ethoxy)ethanol, 2-(2-aminoethyl)aminoethanol, 2-(2-dimethylaminoethyl)methylaminoethanol, 2-(3,4-dimethoxyphenyl)ethylamine, 2-(4-hydroxyphenyl)ethylamine, 2-(diisopropylamino)-ethanol, 2-(dimethylamino)-ethyl-2-propene ester, 2-(ethylamino)ethanol, 2-(ethylmethylamino)-1-phenyl-1-propanol-hydrochloride, 2-(ethylphenylamino)ethanol, 2-(methylamino)ethanol, 2-(propylamino)ethanol, 2,2'-(methylimino)bisethanol, 2,2',2''-trihydroxytriethylamnine, 2,2'-diethyldihexylamine, 2,2'-dimethoxydiethylamine, 2,2-dimethyl-1,3-propanediamine, 2,4,6-triamino-s-triazine, 2,5,8-trimethyl-2,5,8-triazanonane, 2,6-xylidine, 2,8-dimethyl-2,8-diaza-5-oxanonane, 2-amino-1-phenyl-1-propanol, 2-amino-2-methyl-1-propanol, 2-amino-3,5-dinitrothiophene, 2-amino-3,5-dinitrothiophene, 2-amino-3-carbethoxy-5-nitrothiophene, 2-amino-3-hydroxybutyric acid, 2-amino-5-nitrophenol, 2-aminoanthraquinone, 2-aminobenzonitrile, 2-aminoethyl alcohol, 2-aminosulfone, 2-butanamine, (dl)-, 2-butylaminoethanol, 2-dibutylaminoethanol, 2-diethylaminoethylamine, 2-ethoxyethylamine, 2-ethylamino-4-cresol, 2-ethyl-n,n-bis(2-ethylhexyl)-1-hexanamine, 2-methoxy-1-ethanamine, 2-methyl-2-propanamine, 2-methylamino-1-(2-methoxyphenyl)propane, 2-methylamino-1-phenyl-1-propanol, 2-phenylaminoethanol, 2-phenylethylamine, 2-toluidine, 3-(2-ethylhexoxy)-1-propanamine, 3-(2-hydroxyethylamino)-1-propanol, 3-(2-methoxyethoxy)-1-propanamine, 3-(cyclohexylamino)propylamine, 3-(dimethylamino)propylamine, 3-(N-ethyl-N-phenyl)-aminopropionitrile, 3,2'-aminoethylaminopropylamine, 3,3-dimethyl-2-aminobutane, 3,3-dimethylpropargylamine, 3,4-dihydroxyphenylethylamine, 3',6'-bis(ethylamino)-2',7'-dimethylspiro[isobenzofuran-1(3h),9'-[9h]-xanthen]-3-one, 3-amino-1-propanol, 3-aminobenzylamine, 3-aminomethyl-3,5,5-trimethylcyclohexanamine, 3-aminomethyl-heptane, 3-aminomethylpinane, 3-aminonaphthalene-1,5-dissulfonic acid, 3-aminopropionic acid and its salts, 3-azapentane-1,5-diamine, 3-diethylaminopropylamine, 3-dimethylamino-1-propanol, 3-dimethylaminopropionitrile, 3-ethoxy-1-propylamine, 3-ethoxypropylamine, 3-methoxy-1-propanamine, 3-methylaminopropylamine, 3-N-methylamino-1-(2-thienyl)-1-propanol, 4-(2-(3-(4-hydroxyphenyl)-1-methylpropyl)aminoethyl)-1,2-dihydroxybenzene, 4-(3,4-dichlorophenyl)-1,2,3,4-tetrahydro-n-methyl-1-naphthalenamine, 4,4'-bis(diethylamino)benzophenone, 4,4'-diaminodiphenylmethane, 4,4'-methylenebis-(2-methylcyclohexanamine), 4,4'-methylenebisbenzolamine, 4,4'-methylenebiscyclohexanamine, 4,4'-tetramethyl-diamino-dicyclohexylmethane, 4,6-diamino-1,3-benzenedisulfonic acid, 4,7,10-trioxatridecane-1,13-diamine, 4,7-diazadecane-1,10-diamine, 4,7-dioxadecane-1,10-diamine, 4,9-dioxadodecane-1,12-diamine, 4-[[2-(2-methoxyethoxy)ethoxy]carbonyl]aniline, 4-amino-1-(diethylamino)pentane, 4-amino-2-chloro-6,7-dimethoxyquinazoline, 4-aminodiphenylamine-2-sulfonic acid, 4'-aminosulfanilide, 4-chlorophenylethylamine, 4-diethylaminosalicylaldehyde, 4-dimethylaminobenzaldehyde, 4-methoxyphenylethylamine, 1-(1-morpholino)-2-ethylamine, 4-N,N-diethylamino-2-butyn-1-ol, 4-nitro-2-aminophenol, 4-tert-butylaniline, 4-toluidine, 5-acetylamino-2-aminobenzenesulfonic acid, 5-amino-1-pentanol, 5-amino-3-oxapentanol, 5-diethylamino-pentyn-2-ol, 5-nitro-2-aminophenol, 6,13-dichloro-3,10-bis[(3-aminopropyl)amino]-triphendioxazinedisulfonic acid, 6-amino-1-hexanol, 6-chloro-2-toluidine, 6-methylamino-2-methylhept-2-ene, acetaminophene, alpha-(1-(cinnamylmethylamino)ethyl)benzyl alcohol, aminobenzimide, aminobromoquinone, aminocyanothiophene, aminophenoxypropylpyridine, aminophylline, aminopropyl vinyl ether, amino acids (in particular arginine, asparagine, aspartate, cysteine, glutamine, histidine, lysine, methionine, serine, threonine, tryptophan, tyrosine), aniline, benzylamine, benzylaminoethyltheophylline, bis(3-aminopropyl)polytetrahydrofuran, bis(dimethylaminopropyl)methylamine, bisaminobenzylaniline, bisdimethylaminoethyl ether, bishexamethylenetriamine, butyl diglycolamine, chlorophenylethylamine racemate, pure cyclohexylamine, cyclopentylamine, diethanolamine, diisopropanolamine, dimethylamine, dimethylaminoethoxyethanol, ethanolaamine, ethylaamine, ethylenediamine, hexamethylenediamine, homoveratrylamine, isopropanolamine, coconut fatty amine and its ethoxylation products, methoxyisopropylamine, methyl(1-methyl-2-phenylethyl)-prop-2-ynylamine, monoethanolamine, monoisopropanolamine, monoisopropylamine, monomethylamine, N-(2-aminoethyl)ethanolamine, N-(3-aminopropyl)-1,3-propanediamine, N'-(3-aminopropyl)-N,N-dimethyl-1,3-propanediamine, N,N,N',N'-tetramethyl-1,3-diaminopropane, N,N,N',N'-tetramethylhexamethylenediamine, N,N'-bis(3-aminopropyl)ethylenediamine, N,N-diethyl-4-amino-2-butyn-1-ol, N,N-diethylcarbamoyl chloride, N,N-diethylhydroxylamine, N,N-diethyl-N',N'-dimethyl-1,3-propanediamine, N,N-dimethyl-1-butanamine, N,N-dimethyl-2-(4-hydroxyphenyl)ethylamine, N,N-dimethyl-2-propanamine, N,N-dimethyl-4-hydroxyphenylethylamine, N,N-dimethylbenzylamine, N,N-dimethylcyclohexylamine, N,N-dimethylethanolamine, N,N-dimethylethylamine, N,N-dimethyl-n-propylamine, naphthylethylhexylamine, naphthyltridecylamine, N-butyl-1-butanamine, N-butyl-diethanolamine, N-cyclohexylcyclohexanamine, N-ethyl-1,2-dimethylpropylamine, N-ethylcyclohexylamine, N-ethylethanamine, N-hexyl-1-hexanamine, N-methyl-3-phenyl-3-(trifluoro-p-tolyloxy)propylamine, N-methyldiethanolamine, N-methylethanolamine, N-monomethylcyclohexylamine, noradrenaline, N-propyl-1-propanamine, N-sulfoethylethylenediamine sodium salt, N-tridecyltridecanamine, branched or linear, octamylamine, oleylamine and its ethoxylation products, methyl diglycol p-aminobenzoate, p-cyanoethylmethylaminobenzaldehyde, p-diethylaminobenzaldehyde, p-diisopropanolaminetoluidine, p-dimethylaminobenzaldehyde, phenobarbital-1-cyclohexyl-n-methyl-2-propanamine, phenyldiethanolamine, poly(ethylene glycol/propylene glycol)amine, poly(ethylene glycol)amine, poly(propylene glycol)amines, polytetrahydrofaranamine, Rhodamin 6g, stearylamine and its ethoxylation products, tallow fatty amine and its ethoxylation products, tetramethyldiaminodiethyl ether, tetramethyldipropylenetriamine, tridecylamine, tridecylamine isomer mixture, tridecyldiisopropanolamine, triethanolamine, triethylenediamine, triisopropanolamine, trimethylamine, tri-n-butylamine, tri-n-hexylamine, tripropylamine, tyramine, reaction products of ethylenediamine with propene oxide and ethylene oxide (in particular N,N,N',N'-tetrakis(2-hydroxypropyl)-ethylenediamine, N,N,N'-tris(2-hydroxypropyl)ethylenediamine, N,N'-bis(2-hydroxypropyl)-ethylenediamine, N,N-bis(2-hydroxypropyl) ethylenediamine and N-(2-hydroxypropyl)-ethylenediamine).

At least one amine compound selected from the group consisting of primary, secondary, and tertiary, preferably primary, alkylamines, primary, secondary and tertiary, preferably primary, alkanolamines, melamine and urea is very particularly preferably used.

Where it is used, the amine compound is used in general in an amount of from 10 to 30, preferably from 15 to 25, mot %, based on the total amount of the components Aa, Ab, if required Ac and, if required, Ad.

In the novel compositions, preferably used polymers (component A) are those obtainable by reacting
a) from 20 to 80, preferably from 40 to 60, mol % of at least one aldehyde, preferably formaldehyde or paraformaldehyde, as component Aa,
b) from 7 to 21, preferably from 10 to 15, mol % of at, least one aromatic compound which has at least one OM group, preferably phenol, resorcinol or hydroquinone, the stated amount corresponding to the sum of the aromatic compound which has at least one OM group and component Ac, and/or from 10 to 30, preferably from 15 to 25, mol % of at least one aromatic compound which has at least one sulfo group, —$SO_2OM$, preferably phenolsulfonic acid or naphthalenesulfonic acid, as component Ab,
c) if required, at least one compound selected from diphenols or polyphenols having vicinal OM groups, it being possible for the vicinal OH groups to be protected as acetal or ketal, preferably pyrocatechol, as component Ac,
  in the components Ab and Ac, M in each case independently of one another being hydrogen or a cation, preferably an alkali metal cation, particularly preferably a sodium or potassium ion, or a divalent or polyvalent cation, preferably an alkaline earth metal cation or Zn, Zr, Cr, Mn, Fe, Co, Ni, Cu, Al, Ce or V, particularly preferably magnesium, calcium, zinc or manganese, if negative charges sufficient for compensation are present,
d) from 0 to 30, preferably from 10 to 30, particularly preferably from 15 to 25, mol % of at least one amino compound, preferably of a primary, secondary or tertiary alkylamine, of a primary, secondary or tertiary alkanolamine, melamine or urea, as component Ad,
at least one of the components Ac or Ad being reacted in the preparation of the polymer (component A).

It is immaterial whether a synthesis route starting from the abovementioned components was actually chosen or whether only fragments which are formally derived from these components are present in the polymer (component A).

Component A is used in the novel compositions in general in an amount of from 0.01 to 400, preferably from 0.2 to 100, particularly preferably from 1 to 50, g/l, based in each case on one liter of the composition. The exact amount of component A is dependent on the respective method for the treatment of metal surfaces and on the respective metal surface.

Component B

Component B is water or another solvent which is suitable for dissolving or dispersing, suspending or emulsifying the polymer (component A). Other suitable solvents in addition to water are, for example, aliphatic or aromatic solvents, such as benzene, toluene and xylene, halogenated solvents, such as methylene chloride and chloroform, alcohols, such as methanol and ethanol, ethers, such as diethyl ether and tetrahydrofIran, polyethers, in particular polyethylene glycol, ketones, such as acetone, and mixtures of these solvents with one another and/or with water. Particularly preferably, exclusively water is used as the solvent.

The pH is determined by the type of application. For example, pickling and phosphating baths are generally strongly acidic and electroplating baths are basic or acidic, depending on the type of bath. pH values suitable for the specific applications are known to a person skilled in the art.

The amount of water or another solvent depends on whether the novel composition is a ready-to-use composition or a concentrate, and on the respective intended use. In principle, the amount is derived from those concentrations of the individual components which are specified for the ready-to-use composition.

Component C

If required, the novel composition may additionally contain surface-active compounds, emulsifiers and/or dispersants. Suitable surface-active compounds are surfactants which may be cationic, anionic, zwitterionic or nonionic. Suitable surfactants are, for example, alkyl and alkenyl alkoxylates of the type R-EOn/POm, where R are generally linear or branched $C_6$-$C_{30}$-alkyl radicals, preferably $C_8$-$C_{20}$-alkyl radicals, EO is an ethylene oxide unit and PO is a propylene oxide unit, it being possible for EO and PO to be arranged in any desired sequence and n and m, independently of one another, being >1 and <100, preferably >3 and <50, e.g. Emulan®, Lutensol® and Plurafac® (from BASF), alkylphenol ethoxylates, EO/PO block copolymers (Pluronic®, from BASF), alkyl ether sulfates and alkylammonium salts, i.e. quats.

The amount of these components in the novel composition is in general 0.01-100, preferably 0.1 to 20, g/l.

In a preferred embodiment, the novel composition is used for the treatment of metal surfaces and, in addition to components A, B and, if required, C, contains:
d) at least one salt, one acid or one base based on transition metal cations, transition metal oxo anions, fluorometallates or lanthanoids, as component D, and/or
e) at least one acid selected from the group consisting of phosphoric acid, sulfuric acid, sulfonic acids, nitric acid, hydrofluoric acid and hydrochloric acid as component E and/or
f) at least one further corrosion inhibitor as component F and/or
g) compounds of Ce, Ni, Co, V, Fe, Zn, Zr, Ca, Mn, Mo, W, Cr and/or Bi as component G and/or
h) further assistants and additives of component H.

These compositions are particularly suitable for pickling and passivating, in particular phosphating, and as rust converters for the metal surfaces stated in the present application.

Component D

Salts, acids and bases based on transition metal cations, transition metal oxo anions, fluorometallates or lanthanoids are suitable as component D. Suitable transition metal cations are in particular fluorornetallates of Ti (IV), Zr (IV), Hf (IV) and/or Si (IV), and a suitable lanthanoid is in particular Ce. Tungstates and molybdates are furthermore suitable.

Compositions according to the present application, containing component D, are particularly suitable either for depositing an anticorrosion layer on a metal surface or for reinforcing the anticorrosion effect of an anticorrosion layer already deposited on the metal surface. In the novel compositions, the polymers (component A) used according to the invention have an excellent anticorrosion effect. The novel compositions are particularly suitable for coating metal surfaces, a continuous film being formed on the metal surface. Impregnation of the metal surface with the polymer is particularly advantageous, the coating mass of component A falling below 0.5 mg/cm². An excellent corrosion-inhibiting effect is achieved thereby.

If component D is present in the novel compositions, the amount of component D is preferably from 0.02 to 20 g/l.

Component E

The novel compositions may furthermore contain, in addition to or instead of component D, at least one acid selected from the group consisting of phosphoric acid, sulfuric acid, sulfonic acids, such as methanesulfonic acid, vinylsulfonic acid, allylsulfonic acid, m-nitrobenzenesulfonic acid, naphthalenesulfonic acid and derivatives thereof, nitric acid, hydrofludric acid and hydrochloric acid. The type of acid used is dependent on the type of treatment of the metal surface. Thus, phosphoric acid is generally used in phosphating baths for phosphating steel surfaces. In this case, the novel composition is a phosphating solution. Non-layer-forming phosphating solutions, i.e. solutions which have no divalent metals, are distinguished here. Such non-layer-forming phosphating solutions are present, for example, in the form of an iron phosphating solution. If the phosphating solutions contain ions of divalent metals, e.g. zinc and/or manganese, the phosphating solutions are present as layer-forming phosphating solutions. Nitric acid-containing compositions according to the present application are suitable in particular for the surface treatment of zinc and its alloys, while hydrofluoric acid-containing compositions are particularly suitable for the surface treatment of aluminum and its alloys.

The amount of acid used may vary depending on the application. If component E is present in the novel compositions, in general from 0.2 to 200, preferably from 2 to 100, g/l of component E are used.

Component F

The novel compositions may contain at least one further corrosion inhibitor in addition to or instead of components D and/or E. Suitable corrosion inhibitors are selected from the group consisting of butynediol, benzotriazole, aldehydes, amine carboxylates, amino- and nitrophenols, amino alcohols, aminobenzimidazole, aminoimidazolines, aminotriazole, benzimidazole amines, benzothiazoles, derivatives of benzotriazole, boric esters with various alkanolamines, for example diethanolamine borate, carboxylic acids and their esters, quinoline derivatives, dibenzyl sulfoxide, dicarboxylic acids and their esters, diisobutenylsuccinic acid, dithiophosphonic acid, fatty amines and fatty amides, guanidine derivatives, urea and its derivatives, laurylpyridinium chloride, maleamides, mercaptobenzimidazole, N-2-ethylhexyl-3-aminosulfopropionic acid, phosphonium salts, phthalamides, amine- and sodium-neutralized phosphoric esters of alkyl alcohols and these phosphoric esters themselves, phosphoric esters of polyalkoxylates and here in particular of polyethylene glycol, polyetheramines, sulfonium salts, sulfonic acids, for example methanesulfonic acid, thioethers, thioureas, thiuram disulfides, cinnamic acid and its derivatives, zinc phosphates, zinc silicates, zirconium phosphates and zirconium silicates.

Butynediol and benzotriazole (in particular in surface treatment of copper) are preferably used as further corrosion inhibitors.

If they are used at all in the compositions, the corrosion inhibitors are employed in an amount of in general from 0.01 to 50, preferably from 0.1 to 20, particularly preferably from 1 to 10, g/l.

Component G

In addition to or, if required, instead of said components, compounds of Ce, Ni, Co, V, Fe, Zn, Zr, Ca, Mn, Mo, W, Cr and/or Bi may furthermore be used. In general, the novel use of component A in the compositions leads to such good anticorrosion properties that the addition of said compounds is not required. Preferably, the novel compositions are Cr(VI)-free. If said compounds (component G) are nevertheless used, compounds selected from Fe, Zn, Zr and Ca are preferably employed. If these compounds are present at all, the amount thereof in the novel compositions is in general from 0.01 to 100, preferably from 0.1 to 50, particularly preferably from 1 to 20, g/l.

Component H

In addition to one or more of components D to G mentioned, the novel compositions may contain further assistants and additives. Suitable assistants and additives include conductivity pigments or conductive fillers, e.g. iron phosphide, vanadium carbide, titanium nitride, carbon black, graphite, molybdenum disulfide or tin- or antimony-doped barium sulfate, iron phosphide being preferred. Such conductivity pigments or conductive fillers are added to the novel compositions for improving the weldability of the metal surfaces to be treated or for improving the subsequent coating with electrocoating finishes. Silica suspensions may furthermore be used—in particular with the use of the compositions for the treatment of aluminum-containing surfaces.

These assistants or additives are generally present in finely divided form, i.e. their mean particle diameters are in general from 0.005 to 5 µm, preferably from 0.05 to 2.5 µm. The amount of the assistants and additives is in general from 0.1 to 50, preferably from 2 to 35, % by weight, based on the total mass of the novel compositions.

The novel compositions may furthermore contain additives for improving the forming behavior, for example wax-based derivatives based on natural or synthetic waxes, e.g. waxes based on acrylic acid, polyethylene waxes, polytetrafluoroethylene (PTFE) waxes or wax derivatives or paraffins and their oxidation products.

Depending on their application, the novel compositions may contain polymer dispersions based on styrene, 4-hydroxystyrene, butadiene, acrylic acid, acrylic esters, acrylamides, acrylates, methacrylic acid, methacrylic esters, methacrylamides, methacrylates and derivatives of acrylamide. It is furthermore possible for the novel compositions to contain polyurethane dispersions and polyesterurethane dispersions or polyurea dispersions.

A further group of compounds which may be present in the novel compositions comprises polyethylene glycols, polypropylene glycols, copolymers of ethylene oxide and copolymers of propylene oxide.

If the novel compositions are used in powder coatings, they may additionally contain epoxy resins and/or condensation resins of formaldehyde with phenol, urea, melamine, phenolsulfonic acid or naphthalenesulfonic acid.

When the novel compositions are used in rust converters, they may additionally contain polyvinylbutyral.

Depending on the exact composition of the novel compositions, containing component A, they may be used in all applications for the treatment of metal surfaces, in particular in those applications in which the corrosion of metal surfaces may be a problem. Such applications are, for example, removal of coatings, metal pickling, electropolishing, chemical deburring, chemical and electrochemical metal deposition (in particular of Cu, Ni, Pd, Zn, Co, Mn, Fe, Mg, Sn, Pb, Bi, Ag, Au and their alloys), conversion layer formation (in particular conversion layer formation, i.e. processes with a reduced number of rinse operations, for example on galvanized steel and aluminum), corrosion inhibition (in particular on copper, for example in the production of circuit boards, and on steel), lubrication and greasing (in particular in cold working). The type of application corresponds to technically customary methods with the addition that the novel compositions are used together with further components technically customary for the corresponding application, or that they are brought into contact with the metal in additional treatment steps, for example spraying, immersion, coating or electrocoating using suitable formulations of the novel corrosion-inhibiting compositions, such as solutions, emulsions, dispersions, suspensions or aerosols.

The present application furthermore relates to compositions for metal deposition, containing, in addition to components A, B and, if required, C:

i) at least one metal oxide and/or metal salt as component I,
j) if required, at least one complexing agent as component J,
k) if required, at least one acid or one alkali metal salt or alkaline earth metal salt of the corresponding acid as component K, and
l) if required, further additives as component L.

These novel compositions are particularly suitable for the deposition of metals or metal alloys on metal or plastics surfaces. Suitable metal surfaces have been stated above. The deposition of metals or metal alloys on plastics surfaces is preferably carried out in the production of circuit boards. The deposition is preferably carried out in a chemical or electrochemical process.

Component I

Suitable metal oxides or metal salts are the oxides or salts of metals selected from the group consisting of Zn, Ni, Cu, Au, Pd, Sn, Co, Mn, Fe, Mg, Pb, Bi and Ag. The metals may be deposited in the form of the metal used or—with the use of different metals—in the form of alloys of said metals with one another or with other metals. Preferred alloys are CuZn, CuSn, CuNi, SnPb, SnAgBiCu, SnAgCu, SnBi, SnAg, SnCu, NiPd, ZnFe, ZnNi, ZnCo and ZnMn. Said components of the alloys may be present in any desired concentrations in the alloy. Zn, Cu and Ni and alloys of these metals with other metals or with one another are particularly preferably deposited. In the deposition of metals or metal alloys on plastics surfaces, Ni and Cu are particularly preferred. In addition to being used as metal oxide, the metals can be used as metal salts selected from the corresponding sulfates, sulfonic acid salts, chlorides, carbonates, sulfamates, fluoroborates, cyanides and acetates.

The concentration of the metal ions in the novel compositions is in general from 0.01 to 100, preferably from 0.1 to 50, particularly preferably from 2 to 20, g/l, based on the amount of the metal used.

Component J

The novel compositions can, if required, additionally contain a complexing agent. Suitable complexing agents are, for example, ethylenediaminetetraacetic acid (EDTA), ethylenediamine (ED), citric acid and salts of said compounds.

Component K

The novel compositions can, if required, furthermore contain at least one acid or one alkali metal salt or alkaline earth metal salt of the corresponding acid, preferably selected from the group consisting of $HNO_3$, $H_2SO_4$, $H_3PO_4$, formic acid and acetic acid. The acid is used in general in an amount of from 0.5 to 700, preferably from 5 to 200, g/l.

Component L

In addition to said components, the novel compositions may contain further additives which may differ depending on the intended use, metal to be deposited, objective and method used. Suitable additives are 1-(2-vinylpyridinium)-2-ethylsulfobetaine, 1,1-dimethyl-2-propyn-1-ylamine, 1-pyridinium-2-ethylsulfobetaine, 1-pyridinium-2-hydroxy-3-propylsulfobetaine, 1-pyridinium-3-propylsulfobetaine, 2,2'-dichlorodiethyl ether, 2,5-dimethyl-3-hexyne-2,5-diol, 2-butyne-1,4-diol, 2-butyne-1,4-diol ethoxylate, 2-butyne-1,4-diol propoxylate, 3-(2-benzothiazolylthio)-1-propanesulfonic acid sodium salt, 3,3'-dithiobis-(1-propanesulfonic acid) sodium salt, 3-[(aminoiminomethyl)thiol]-1-propanesulfonic acid, 3-[(dimethylamino)thioxomethyl]thio-1-propanesulfonic acid sodium salt, 3-[ethoxythioxomethyl]thio-1-propanesulfonic acid potassium salt, 3-chloro-2-hydroxy-1-propanesulfonic acid sodium salt, 3-hexyne-2,5-diol, 3-mercapto-1-propanesulfonic acid sodium salt, 4,4-dihydroxydiphenyl sulfone, 4-methoxybenzaldehyde, aldehydes, alkylphenyl polyethylene oxide sulfopropyl ether potassium salts, alkylpolyethylene oxide sulfopropyl ether potassium salts, for example tridecyl/pentadecylpolyethylene oxide sulfopropyl ether potassium salt, allylsulfonic acid sodium salt, amidosulfonic acid, amine- and sodium-neutralized phosphoric esters of alkyl alcohols, amine carboxylates, amino- and nitrophenols, amino alcohols, aminobenzimidazole, aminoimidazolines, aminiotriazole, methyl benzalacetate, benzalacetone, benzimidazolamines, benzothiazoles, benzotriazole and its derivatives, benzylpyridine 3-carboxylate, bisphenol A, boric esters with various alkanolamines, for example diethanolamine borate, carboxylic acids and their esters, carboxyethylisothiuroniumbetaine, quinoline derivatives, copolymers of ethylene and acrylic acid, copolymers of imidazole and epichlorohydrin, copolymers of imidazole, morpholine and epichlorohydrin, copolymers of N,N'-bis[3-(dimethylamino)propyl]urea and 1,1'-oxybis[2-chloroethane], copolymers of n-butyl acrylate, acrylic acid and styrene, dibenzyl sulfoxide, dicarboxylic acids and their esters, diethylenetriaminepentaacetic acid and salts derived therefrom, diisobutenylsuccinic acid, disodium ethylenebisdithiocarbamate, dithiophosphonic acid, ethylamidosulfonic acid, ethylenediaminetetraacetic acid and salts derived therefrom, ethylglycinediacetic acid and salts derived therefrom, ethylhexanol ethoxylate, fatty amines and fatty amides, formaldehyde, glyceryl ethoxylate, guanidine derivatives, urea and its derivatives, hydroxyethyliminodiacetic acid and salts derived therefrom, imidazole, isopropylamidosulfonic acid, isopropylamidosulfonyl chloride, lauryl/myristyltrimethylammonium methosulfate, laurylpyridinium chloride, maleamides, mercaptobenzimidazole, methylamidosulfonic acid, N,N,N',N'-tetrakis(2-hydroxypropyl)-ethylenediamine, N,N-diethyl-2-propyn-1-ylamine, N,N-diethyl-4-amino-2-butyn-1-ol, N,N-dimethyl-2-propyn-1-ylamine, N-2-ethylhexyl-3-aminosulfopropionic acid, N-allylpyridinium chloride, sodium salt of sulfated alkylphenol ethoxylates, sodium 2-ethylhexylsulfate, nicotinic acid, nitrilotriacetic acid and salts derived therefrom, nitrobenzenesulfonic acid sodium salt, N-methallylpyridinium chloride, ortho-chlorobenzaldehyde, phosphonium salts, phthalamides, picolinic acid, polyetheramines, polyethyleneimines, polyvinylimidazole, propargyl alcohol, propargyl alcohol ethoxylate, propargyl alcohol propoxylate, propynesulfonic acid sodium salt, propiolic acid, propylenediaminetetraacetic acid and salts derived therefrom, pyrrole, quatemized polyvinylimidazole, reaction product of 2-butyne-1,4-diol and epichlorohydrin, reaction product of 2-butyne-1,4-diol and propane sultone, reaction product of saccharin and propane sultone, reaction product of alkyl ethoxylate/propoxylate with propane sultone, reaction product of polyethyleneimine with propane sultone, reaction product of β-naphthol ethoxylate/propoxylate with propane sultone, resorcinol ethoxylate, saccharin, β-napthol ethoxylate, β-naphthol ethoxylate sulfate sodium salt, sulfonium salts, sulfonic acids, for example methanesulfonic acid, thiodiglycol, thiodiglycol ethoxylate, thioethers, thioureas, thiuram disulfides, vinylsulfonic acid sodium salt, cinnamic acid and its derivatives, zinc phosphates, zinc silicates, zirconium phosphates, zirconium silicates, hypophosphites (e.g. sodium hypophosphite), $NaBH_4$, dimethylaminoborane, diethylaminoborane, hydrazine, formaldehyde, urotropine, palladium chloride, sodium stannate, $HF \times BF_3$, polyethylene glycols having a molecular weight of 100-1 000 000 g/mol, block copolymers of ethylene oxide and propylene oxide, for example Pluronic grades from BASF Aktiengesellschaft, Ludwigshafen/Rh., and random copolymers of ethylene oxide and propylene oxide, in particular having molecular weights of 100-2 000 g/mol.

With the aid of the novel compositions according to this embodiment, in particular metal deposits are possible by an electrochemical or chemical method. Whether an electrochemical or chemical deposition is carried out is dependent on the metal, on the metal surface and on the desired result.

Process for the Treatment of a Metal or Plastics Surface

The present application furthermore relates to a process for the treatment of a metal surface, the metal surface being brought into contact with a polymer (component A) composed of:

the structural element (1)

 (1)

and at least three structural elements selected from the group consisting of

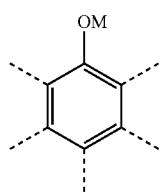 (2)

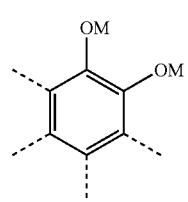 and/or 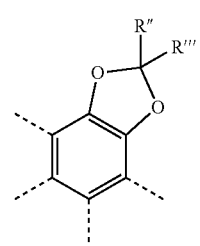 (3)

-continued

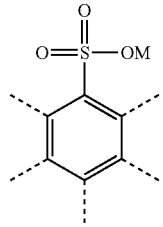 (4)

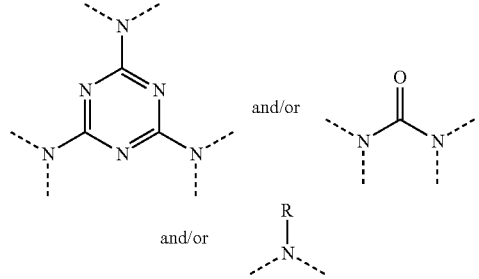 (5)

where
in structural element (1)
R' is hydrogen or an alkyl, cycloalkyl, aryl, aralkyl or alkaryl radical of less than 31 carbon atoms which may be unsubstituted or substituted by alkyl radicals or heteroatom-containing groups, preferably chloro, hydroxyl or amino groups, or may be interrupted by heteroatoms, preferably nitrogen or oxygen, or may contain double bonds; R' is preferably hydrogen or $C_{1-6}$-alkyl, $C_{1-6}$-hydroxyalkyl, $C_{1-6}$-aminoalkyl or $C_{6-10}$-aryl,
in structural element (3)
R" and R'" are any desired radicals having a molecular weight of <200 g/mol, preferably independently of one another hydrogen or alkyl, cycloalkyl, aryl, aralkyl or alkaryl radicals, preferably hydrogen or $C_{1-6}$-alkyl- or $C_{6-10}$-aryl radicals,
in structural elements (2), (3) and (4)
M, in each case independently of one another, are hydrogen or a cation, preferably an alkali metal cation, particularly preferably a sodium or potassium ion, or a divalent or polyvalent cation, preferably an alkaline earth metal cation or Zn, Zr, Cr, Mn, Fe, Co, Ni, Cu, Al, Ce or V, particularly preferably magnesium, calcium, zinc or manganese, if negative charges sufficient for compensation are present,
and
in structural element (5)
R is hydrogen or an alkyl, cycloalkyl, aryl, aralkyl or alkaryl radical which may be unsubstituted or substituted by alkyl radicals or heteroatom-containing groups, preferably chloro, hydroxyl or amino groups, or may be interrupted by heteroatoms, preferably nitrogen or oxygen; R is preferably hydrogen or $C_{1-6}$-alkyl, $C_{1-6}$-hydroxyalkyl, $C_{1-6}$-aminoalkyl or $C_{6-10}$-aryl.

This polymer and preferred embodiments of the polymer and suitable preparation processes are mentioned above (cf. component A). Suitable metal surfaces and preferred embodiments of the metal surfaces are likewise mentioned above.

Suitable processes are, for example, removal of coatings, metal pickling, electropolishing, chemical deburring, chemical and electrochemical metal deposition, conversion layer formation (in particular no-rinse conversion layer formation), corrosion inhibition (in particular on copper, for example in the production of circuit boards, and on steel), lubrication and greasing (in particular in cold working).

The polymer may be present in the novel process in solution, in emulsion or suspension or in an aerosol. Preferably, the polymer (component A) is present in one of the novel compositions stated above.

The type of application corresponds to technically customary methods with the addition that the polymers (component A) used according to the invention are employed together with further components technically customary for the corresponding application, or that they are brought into contact with the metal in additional treatment steps, for example spraying, immersion, coating or electrocoating using suitable formulations of the polymers.

In a preferred embodiment of the novel process, a metal surface is brought into contact with a composition which comprises components A, B and, if required, C, or with a composition which comprises components D and/or E and/or F and/or G and/or H as further components in addition to components A, B and, if required, C. Suitable components B to H are mentioned above. In this preferred embodiment of the novel process, a pickling or a passivation, in particular a phosphating of the metal surface, is preferably carried out. Suitable process steps and apparatuses for the passivation, in particular phosphating, or the pickling of metal surfaces are known to a person skilled in the art.

In general, the treatment of the metal surfaces, in particular a passivation, particularly preferably a phosphating or pickling, is carried out by spraying a novel composition onto the metal surface or immersing the metal surface in a novel composition, depending on the number, size and shape of the parts to be treated.

If a phosphating of metal strips is carried out, the novel compositions containing phosphoric acid as component E can be applied by a roll-on or dry-in-place or no-rinse method, the novel phosphating composition being applied to the metal strip and being dried without rinsing, a polymer film forming.

The present application furthermore relates to a process comprising the steps:
a) if required, cleaning of the metal surface for removal of oils, greases and dirt,
is b) if required, washing with water,
c) if required, pickling in order to remove rust or other oxides, in the presence or absence of the polymer (component A) used according to the invention,
d) if required, washing with water,
e) treatment of the metal surface in the presence of the polymer (component A) used according to the invention,
f) if required, washing with water,
g) if required, aftertreatrnent, in the presence or absence of the polymer (component A) used according to the invention.

The treatment of the metal surface in step e) may be a passivation, in particular a phosphating, by the process known to a person skilled in the art. A protective layer, a film or an impregnation is applied to the metal. If a phosphating is carried out in step e), an aftertreatment of the metal surface in step g) with passivating additives is possible.

The washing with water is carried out between the individual process steps in order to avoid contamination of the solution required for the respective subsequent step with components of the solution used in the preceding step. However, it is also possible to carry out the novel process as a no-rinse process, i.e. without the steps b), d) and f).

The steps for cleaning (step a)) and for treatment of the metal surface in the presence of the polymer (component A) used according to the invention, preferably the passivating (step e)), can also be carried out in one step, i.e. using a formulation which also contains the novel composition in addition to the conventional cleaning agents.

After the process steps a) to g), the metal surface can be provided with a finish. Coating is likewise carried out by methods known to a person skilled in the art.

A further preferred embodiment of the present application relates to a process for the deposition of metals or metal alloys on a metal surface, the metal surface being brought into contact with a composition which contains components A, B and, if required, C, or with a composition which contains components I, if required J, if required K and if required L as further components in addition to components A, B and, if required, C. Suitable components A, B, C, I, J, K, L have been mentioned above.

A further embodiment of the present invention relates to a process for the deposition of metals or metal alloys on a plastics surface, the plastics surface being brought into contact with a polymer (component A) composed of
the structural element (1)

(1)

and at least three structural elements selected from the group consisting of

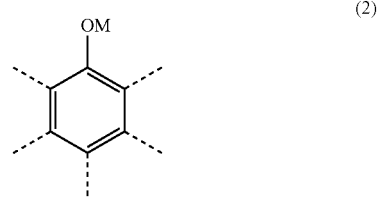

(2)

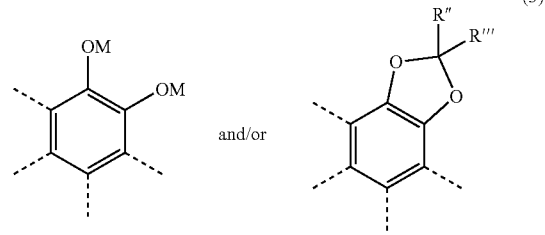

(3)

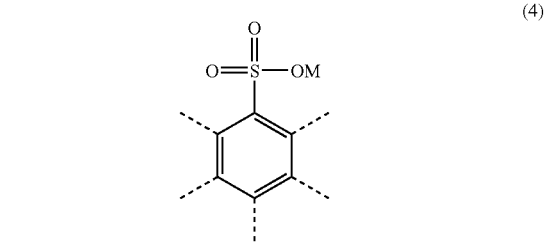

(4)

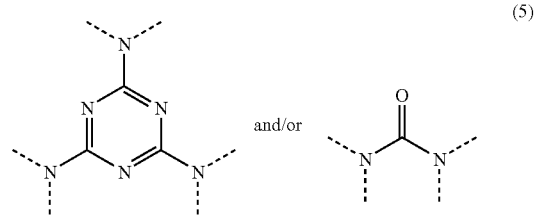

(5)

and/or 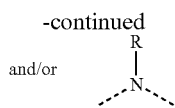

where
in structural element (1)
R' is hydrogen or an alkyl, cycloalkyl, aryl, aralkyl or alkaryl radical of less than 31 carbon atoms which may be unsubstituted or substituted by alkyl radicals or heteroatom-containing groups, preferably chloro, hydroxyl or amino groups, or may be interrupted by heteroatoms, preferably nitrogen or oxygen, or may contain double bonds; R' is preferably hydrogen or $C_{1-6}$-alkyl, $C_{1-6}$-hydroxyalkyl, $C_{1-6}$-aminoalkyl or $C_{6-10}$-aryl,
in structural element (3)
R″ and R‴ are any desired radicals having a molecular weight of <200 g/mol, preferably independently of one another hydrogen or alkyl, cycloalkyl, aryl, aralkyl or alkaryl radicals, particularly preferably hydrogen or $C_{1-6}$-alkyl- or $C_{6-10}$-aryl radicals,
in structural elements (2), (3) and (4)
M, in each case independently of one another, are hydrogen or a cation, preferably an alkali metal cation, particularly preferably a sodium or potassium ion, or a divalent or polyvalent cation, preferably an alkaline earth metal cation or Zn, Zr, Cr, Mn, Fe, Co, Ni, Cu, Al, Ce or V, particularly preferably magnesium, calcium, zinc or manganese, if negative charges sufficient for compensation are present,
and
in structural element (5)
R is hydrogen or an alkyl, cycloalkyl, aryl, aralkyl or alkaryl radical which may be unsubstituted or substituted by alkyl radicals or heteroatom-containing groups, preferably chloro, hydroxyl or amino groups, or may be interrupted by heteroatoms, preferably nitrogen or oxygen; R is preferably hydrogen or $C_{1-6}$-alkyl, $C_{1-6}$-hydroxyalkyl, $C_{1-6}$-aminoalkyl or $C_{6-10}$-aryl.

In the novel process, the plastics surface is preferably brought into contact with a composition which contains components A, B and, if required, C, or with a composition which contains components I, if required J, if required K and, if required, L as further components in addition to components A, B and, if required, C. Suitable components A, B, C, I, J, K, L have been mentioned above.

Deposition of metals or metal alloys on a plastics surface is generally carried out in the metallization of plastics, in particular in the production of circuit boards.

In a particularly preferred embodiment, the deposition of metals or metal alloys on metal or plastics surfaces is effected in the novel process in each case chemically or electrochemically. Such processes are known to a person skilled in the art. In the novel process, chemical or electrochemical gold deposition, chemical or electrochemical copper deposition, chemical or electrochemical nickel deposition, chemical palladium deposition, electrochemical zinc deposition or electrochemical tin deposition is particularly preferably carried out. In addition to the deposition of said metals, said processes also include the deposition of their alloys with other elements; CuZn, CuSn, CuNi, SnPb, SnAgBiCu, SnAgCu, SnBi, SnAg, SnCu, NiPd, ZnFe, ZnNi, ZnCo and ZnMn are particularly preferred, it being possible for said components of the alloys to be present in the alloy in any desired concentration. Processes in which conductive polymers are deposited are also according to the invention, these being regarded as metals in the widest sense. Such a conductive polymer is polypyrrole.

Further embodiments of the novel process are, for example, cleaning, etching, polishing and pickling processes in which, in addition to the novel use of component A, acids, oxidizing agents and corrosion inhibitors and dissolved metal salts are simultaneously used, and processes for the production of circuit boards, in which compositions containing component A can be used both in the metallization of the circuit board, including the holes contained therein, and for the surface treatment of the circuit board. Compositions containing component A can be used, on the one hand, in the surface treatment of metals present on the circuit board, for example with the aim of corrosion inhibition or improving the solderability, as well as in processes in which nonconductive surfaces are treated with the compositions used according to the invention and containing component A, during metal deposition, for example with the aim of through-plating of circuit boards.

In addition to the use of the polymer (component A) used according to the invention in said processes, in particular for pickling or passivating, especially phosphating, of metal surfaces or for deposition of metals on metal or plastics surfaces, it is possible to add the polymers (component A) used according to the invention wherever corrosion inhibition is desired.

The present application furthermore relates to the use of polymers (component A) composed of
the structural element (1)

and at least three structural elements selected from the group consisting of

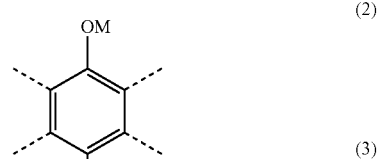

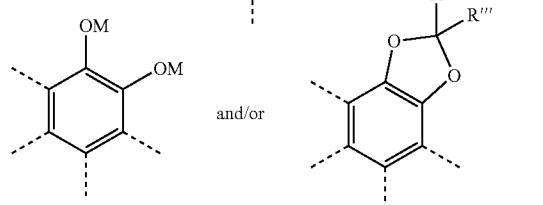

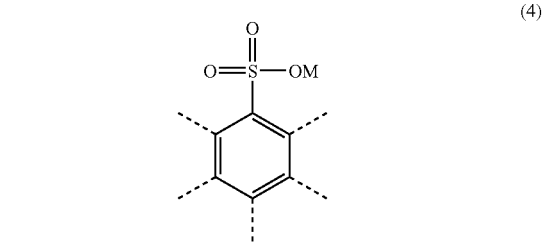

25

-continued

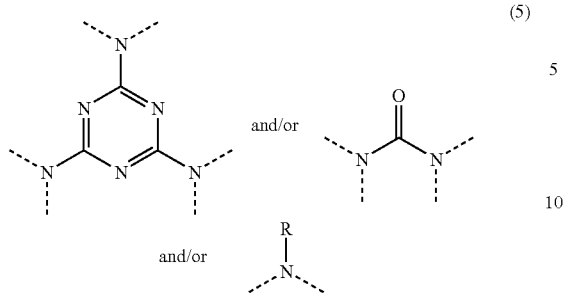

(5)

and/or and/or where in structural element (1)

R' is hydrogen or an alkyl, cycloalkyl, aryl, aralkyl or alkaryl radical of less than 31 carbon atoms which may be unsubstituted or substituted by alkyl radicals or heteroatom-containing groups, preferably chloro, hydroxyl or amino groups, or may be interrupted by heteroatoms, preferably nitrogen or oxygen, or may contain double bonds; R' is preferably hydrogen or $C_{1-6}$-alkyl, $C_{1-6}$-hydroxyalkyl, $C_{1-6}$-aminoalkyl or $C_{6-10}$-aryl, in structural element (3)

R" and R'" are any desired radicals having a molecular weight of <200 g/mol, preferably independently of one another hydrogen or alkyl, cycloalkyl, aryl, aralkyl or alkaryl radicals, preferably hydrogen or $C_{1-6}$-alkyl- or $C_{6-10}$-aryl radicals, in structural elements (2), (3) and (4)

M, in each case independently of one another, are hydrogen or a cation, preferably an alkali metal cation, particularly preferably a sodium or potassium ion, or a divalent or polyvalent cation, preferably an alkaline earth metal cation or Zn, Zr, Cr, Mn, Fe, Co, Ni, Cu, Al, Ce or V, particularly preferably magnesium, calcium, zinc or manganese, if negative charges sufficient for compensation are present, and in structural element (5)

R is hydrogen or an alkyl, cycloalkyl, aryl, aralkyl or alkaryl radical which may be unsubstituted or substituted by alkyl radicals or heteroatom-containing groups, preferably chloro, hydroxyl or amino groups, or may be interrupted by heteroatoms, preferably nitrogen or oxygen; R is preferably hydrogen or $C_{1-6}$-alkyl, $C_{1-6}$-hydroxyalkyl, $C_{1-6}$-aminoalkyl or $C_{6-10}$-aryl, for the treatment of metal. The polymers (component A) are preferably used for the corrosion inhibition of metal surfaces.

Preferably used polymers and suitable metal surfaces and suitable corrosion inhibition processes or processes in which said polymers can be used have been mentioned above.

A further preferred use relates to the use of polymers composed of the structural element (1)

(1)

26 and at least three structural elements selected from the group consisting of

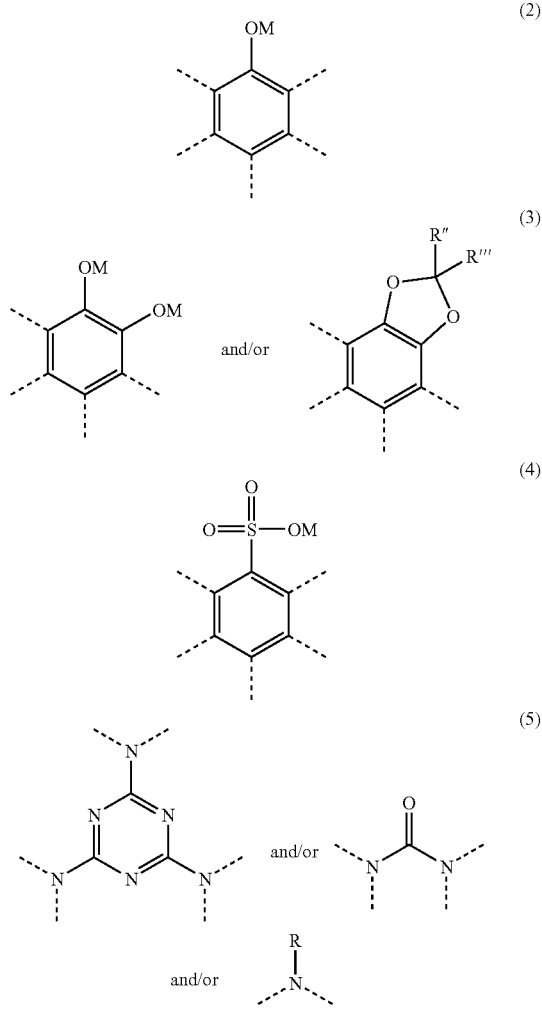

where in structural element (1)

R' is hydrogen or an alkyl, cycloalkyl, aryl, aralkyl or alkaryl radical of less than 31 carbon atoms which may be unsubstituted or substituted by alkyl radicals or heteroatom-containing groups, preferably chloro, hydroxyl or amino groups, or may be interrupted by heteroatoms, preferably nitrogen or oxygen, or may contain double bonds; R' is preferably hydrogen or $C_{1-6}$-alkyl, $C_{1-6}$-hydroxyalkyl, $C_{1-6}$-aminoalkyl or $C_{6-10}$-aryl, in structural element (3)

R" and R'" are any desired radicals having a molecular weight of <200 g/mol, preferably independently of one another hydrogen or alkyl, cycloalkyl, aryl, aralkyl or alkaryl radicals, particularly preferably hydrogen or $C_{1-6}$-alkyl- or $C_{6-10}$-aryl radicals, in structural elements (2), (3) and (4)

M, in each case independently of one another, are hydrogen or a cation, preferably an alkali metal cation, particularly preferably a sodium or potassium ion, or a divalent or polyvalent cation, preferably an alkaline earth metal cation or Zn, Zr, Cr, Mn, Fe, Co, Ni, Cu, Al, Ce or V, particularly preferably magnesium, calcium, zinc or manganese, if negative charges sufficient for compensation are present, and in structural element (5)

R is hydrogen or an alkyl, cycloalkyl, aryl, aralkyl or alkaryl radical which may be unsubstituted or substituted by alkyl radicals or heteroatom-containing groups, preferably chloro, hydroxyl or amino groups, or may be interrupted by heteroatoms, preferably nitrogen or oxygen; R is preferably hydrogen or $C_{1-6}$-alkyl, $C_{1-6}$-hydroxyalkyl, $C_{1-6}$-aminoalkyl or $C_{6-10}$-aryl, for the deposition of metals or metal alloys on a plastics surface.

The examples which follow additionally illustrate the invention.

EXAMPLES

Preparation of Polymers P

The following polymers were prepared by technically customary methods according to the synthesis scheme described below:

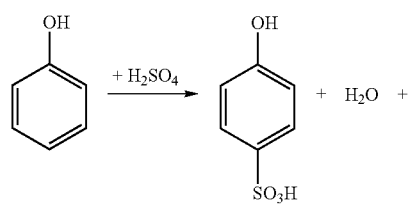

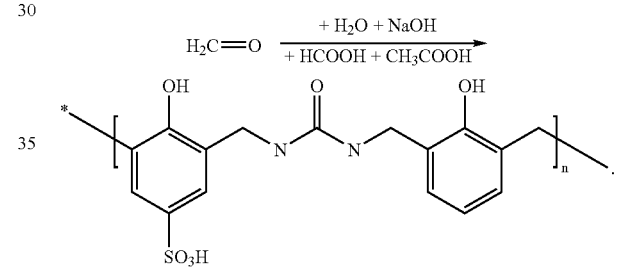

TABLE 1

| | Sample composition (amount in mol) | | | | | | | | | pH 8-8.2 | | pH 3.5-4 | extra | Mass | |
|---|---|---|---|---|---|---|---|---|---|---|---|---|---|---|---|
| Polymer number | Phenol | $H_2SO_4$ 96% | Ethanolamine | Urea | Formaldehyde (37%) | $NH_3$ (25%) | Phenol | Pyrocatechol | Formaldehyde (37%) | NaOH (50%) | Formic acid | Acetic acid | Benzoic acid | $H_2O$ added | fraction (w) | pH |
| 1 | 1.0 | 1.1 | — | 1.1 | 1.9 | 0.6 | 0.7 | — | 0.5 | 0.8 | 0.1 | 0.4 | — | 12.4 | 41.9 | 3.8 |
| 2 | 1.0 | 1.1 | — | 1.1 | 1.9 | 0.6 | — | 0.7 | 0.5 | 0.9 | 0.1 | 1.0 | — | 12.4 | 42.5 | 4.0 |
| 3 | 1.0 | 1.1 | 1.1 | — | 1.9 | 0.6 | 0.7 | — | 0.5 | 1.0 | 0.2 | 2.7 | — | 12.4 | 40.2 | 4.4 |
| 4 | 1.0 | 1.1 | — | 1.1 | 1.9 | 0.6 | 0.4 | 0.4 | 0.5 | 0.9 | 0.2 | 0.4 | — | 12.9 | 43.0 | 3.9 |
| 5 | 1.0 | 1.1 | — | 1.1 | 1.9 | 0.6 | 0.5 | 0.2 | 0.5 | 0.8 | 0.2 | 0.6 | — | 8.0 | 48.9 | 3.9 |
| 6 | 1.0 | 1.1 | — | 1.1 | 1.9 | 0.6 | 0.7 | — | 0.5 | 0.8 | — | 1.1 | — | 7.4 | 48.6 | 3.9 |
| 7 | 1.0 | 1.1 | — | 1.1 | 1.9 | 0.6 | 0.7 | — | 0.5 | 0.8 | — | — | 2.7 | 7.4 | 36.9 | 4.8 |
| 8 | 1.0 | 1.1 | — | 1.1 | 1.9 | 0.6 | 0.7 | — | 0.5 | 0.7 | — | — | — | 12.9 | 43.3 | 7.2 |
| 9 | 1.0 | 1.1 | — | 1.1 | 1.9 | 0.6 | 0.7 | — | 0.5 | 0.8 | — | — | — | 12.9 | 42.1 | 8.2 |
| 10 | 1.0 | 1.1 | — | 1.1 | 1.9 | 0.6 | — | 0.7 | 0.5 | 0.7 | — | — | — | 12.9 | 45.4 | 7.0 |
| 11 | 1.0 | 1.1 | — | 1.1 | 1.9 | 0.6 | — | 0.7 | 0.5 | 0.8 | — | — | — | 12.9 | 45.8 | 8.0 |

Corrosion-inhibiting Effect of the Polymers Used According to the Invention on Steel Test Method Gravimetric determination of the corrosion rate as mass loss: Electrolyte: 0.03 M NaCl in demineralized water, brought to pH 10 with KOH, metering of the test substance in electrolyte with 2% of active substance, testing at room temperature, 7 days. Standards: corrosion test without test substance and corrosion test with Korantin PAT (1%).

Result

All substances tested have a corrosion-inhibiting effect. Regarding the inhibiting effect, no clear difference was detectable between pyrocatechol-containing and pyrocatechol-free active substances (cf. table 2 below).

|  | Example B1 | Example B2 | Example B3 | Example B4 |
|---|---|---|---|---|
| Formic acid |  |  |  | 75 |
| Acetic acid |  |  |  | 16 |

The numbers in the table denote the concentration of the respective substance in water in g/l, unless stated otherwise.

Examples B5-B8

Analogously to B1-B4, but with steel sheets which are electroplated with ZnFe (containing 10% by weight of Fe).

TABLE 2

Gravimetric corrosion tests

| Sample Number | AS[1] content | Inhibition efficiency Metal sheet 1 | Inhibition efficiency Metal sheet 2 | Mass loss/mg cm$^{-2}$ Average | Mass loss/mg cm$^{-2}$ Metal sheet 1 | Mass loss/mg cm$^{-2}$ Metal sheet 2 | pH of the electrolytes Metal sheet 1 before | pH of the electrolytes Metal sheet 1 after | pH of the electrolytes Metal sheet 2 before | pH of the electrolytes Metal sheet 2 after |
|---|---|---|---|---|---|---|---|---|---|---|
| 1 | 42% | 56% | 54% |  | 1.09 | 1.13 | 4 | 4 | 4 | 4 |
| 2 | 43% |  | 57% |  |  | 1.06 | 4 | 4 | 4 | 4 |
| 3 | 40% | 6% | 14% |  | 2.320 | 2.130 | 4 | 4 | 4 | 4 |
| 4 | 43% | 21% | 27% |  | 1.96 | 1.81 | 4 | 4 | 4 | 4 |
| 5 | 49% | 33% | 33% |  | 1.650 | 1.650 | 4 | 4 | 4 | 4 |
| 6 | 49% | 68% | 88% |  | 0.79 | 0.29 | 4 | 4 | 4 | 4 |
| 7 | 37% | 82% | 82% |  | 0.43 | 0.45 | 4 | 4 | 4 | 4 |
| 8 | 43% | 78% | 79% |  | 0.54 | 0.52 | 4 | 7 | 4 | 7 |
| 9 | 42% | 24% | 21% |  | 0.51 | 0.53 | 8 | 7 | 8 | 7 |
| 10 | 45% | 24% | 26% |  | 0.51 | 0.50 | 7 | 5 | 7 | 5 |
| 11 | 46% | 15% | 20% |  | 0.57 | 0.53 | 8 | 7 | 8 | 7 |
| Standard (Korantin PAT) |  | 89% | 85% |  | 0.08 | 0.11 | 9 | 9 | 9 | 9 |
| Standard without AS[1] (pH 10) |  |  |  | 0.71 | 0.72 | 0.71 | 10 | 7 | 10 | 7 |
| Standard without AS[1] (pH 7) |  |  |  | 0.67 | 0.65 | 0.69 | 7 | 6 | 7 | 6 |
| Standard without AS[1] (pH 4) |  |  |  | 2.47 | 2.54 | 2.40 | 4 | 6 | 4 | 6 |

Metering of the test substances with 2% by weight of AS, metering of Korantin PAT 1% by weight
Inhibition efficiency E = 1 − ($\Delta m_{sample}/\Delta m_0$); $\Delta m_0$ is the mass loss of the standard without active substance in an electrolyte of the same pH.
[1] Active substance content The polymers are used in the following formulations for metal treatment by technically customary methods.

Examples B1-B4

Steel sheets which are electroplated with zinc are treated with the following formulations by immersion for 60 seconds at 50° C.:

|  | Example B1 | Example B2 | Example B3 | Example B4 |
|---|---|---|---|---|
| Polymer 1 | 60 | 60 |  |  |
| Polymer 2 |  |  | 50 |  |
| Polymer 3 |  |  |  | 40 |
| MgCl$_2$ | 8.5 |  |  |  |
| Sodium acetate | 45 | 8.5 |  |  |
| Sodium formate | 80 | 64 |  |  |
| 65% nitric acid |  |  | 40 ml/l |  |
| H$_2$SO$_4$ |  |  | 5.5 |  |
| H$_3$PO$_4$ |  |  | 16 |  |
| NaNO$_3$ |  |  | 50 |  |

Example B9

An aluminum sheet is anodized at a current density of 15 A/dm$^2$ and 100° C. in a solution of the following composition: 70% by weight of H$_3$PO$_4$, 10% by weight of H$_2$SO$_4$, 4% by weight of HNO$_3$, 0.5% by weight of boric acid, 16% by weight of NH$_5$F$_2$ and 9.5% of polymer 4.

Example B10

Cast iron is immersed for 15 seconds at room temperature in a solution comprising 10% of H$_2$SO$_4$ and 30% of polymer 5.

Example B11

100 g of a polymer dispersion (30% solids content comprising a copolymer composed of 47% by weight of n-butyl acrylate, 50% by weight of styrene and 3% by weight of acrylic acid) are mixed with 100 g of water and 2 g of polymer 10 and used for coating a zinc-plated steel sheet passivated with HNO$_3$ (0.05% by weight).

Example B12

Electrochemical Zinc Alloy Deposition

For the electrochemical deposition of an alloy layer comprising zinc and a further metal M at 40° C. and a current density of 1.5 A/dm$^2$, electroplating baths of the following composition are used.
- 10 g/l of zinc, as zinc oxide
- 2 g/l of metal M, as sulfate
- 100 g/l of sodium hydroxide
- 15 g/l of carboxymethylated polyethyleneimine sodium salt, from example 1
- 5 g/l of polyethyleneimine Lugalvan G20 from BASF Aktiengesellschaft, Ludwigshafen/Rh.
- 5 g/l of polymer 7
- 1 g/l of pyridiniumpropylsulfobetaine The metal M is alternatively cobalt, iron, nickel or manganese.

Application Tests B1-B11

The products of examples B1 to B11 are tested in the salt spray test and have service lives which are 5-30% higher than in the case of comparable processes in which the polymers used according to the invention are not used.

We claim:

1. A composition for the treatment of metal surfaces, containing
   a) at least one polymer as component A, composed of
      a structural element (1),
      at least three structural elements selected from the group consisting of structural elements (2), (4), and (5),
      and optionally further structural element(s) (3),
      wherein the structural elements 1-5 are represented by the following formulas (1) R'-C (2) benzene ring with OM substituent (3) benzene ring with two OM substituents and/or benzodioxole with R", R'''

-continued (4) benzene ring with SO$_2$-OM substituent (5) triazine with three N substituents and/or urea-type N-C(O)-N and/or R-N where
in structural element (1), R' is hydrogen or an alkyl, cycloalkyl, aryl, aralkyl or alkaryl radical of less than 31 carbon atoms which may be unsubstituted or substituted by alkyl radicals or heteroatom-containing groups or may be interrupted by heteroatoms or may contain double bonds;
in structural element (3), R" and R''' are any desired radicals having a molecular weight of <200 g/mol,
in structural elements (2), (3) and (4), M, in each case independently of one another, are hydrogen or a cation, and
in structural element (5), R is hydrogen or an alkyl, cycloalkyl, aryl, aralkyl or alkaryl radical which may be unsubstituted or substituted by alkyl radicals or heteroatom-containing groups or may be interrupted by heteroatoms;

b) water or another solvent which is suitable for dissolving, dispersing, suspending or emulsifying the polymer (component A), as component B;

c) optionally, surface-active compounds, dispersants, suspending media and/or emulsifiers, as component C, d) at least one salt, one acid or one base based on transition metal cations, transition metal oxo anions, fluorometallates or lanthanoids, as component D,
and/or e) at least one acid selected from the group consisting of phosphoric acid, sulfuric acid, sulfonic acids, nitric acid, hydrofluoric acid and hydrochloric acid, as component E,
and/or f) at least one further corrosion inhibitor as component F,
and/or g) compounds of Ce, Ni, Co, V, Fe, Zn, Zr, Ca, Mn, Mo, W, Cr and/or Bi as component G,
and/or h) further assistants and additives as component H,
wherein the polymer (component A) is prepared by polycondensation, wherein the following components are reacted with one another:

(1) at least one aldehyde as component Aa,
(2) at least one aromatic compound which carries at least one OM group or one sulfo group, —SO₂OM, or both groups, as component Ab,
(3) optionally at least on compound selected from diphenols or polyphenols having vicinal OM groups, it being possible, if required, for the vicinal OH groups to be protected as acetal or ketal, as component Ac, and
(4) at least one amino compound as component Ad,
and where, in components Ab and Ac, M, in each case independently of one another, are hydrogen or a cation, or a divalent or polyvalent cation, if negative charges sufficient for compensation are present.

2. A composition for the treatment of metal surfaces, containing
a) at least one polymer as component A, composed of
a structural element (1),
at least three structural elements selected from the group consisting of structural elements (2), (4), and (5), and optionally further structural element(s) (3),
wherein the structural elements 1-5 are represented by the following formulas

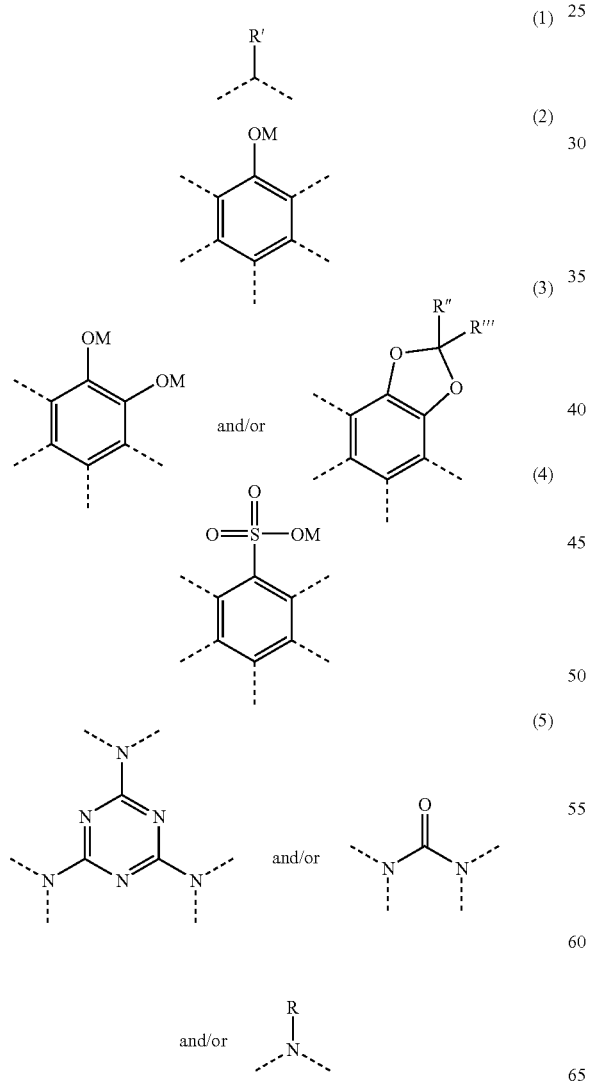

where
in structural element (1), R' is hydrogen or an alkyl, cycloalkyl, aryl, aralkyl or alkaryl radical of less than 31 carbon atoms which may be unsubstituted or substituted by alkyl radicals or heteroatom-containing groups or may be interrupted by heteroatoms or may contain double bonds;
in structural element (3), R" and R'" are any desired radicals having a molecular weight of <200 g/mol,
in structural elements (2), (3) and (4), M, in each case independently of one another, are hydrogen or a cation, and
in structural element (5), R is hydrogen or an alkyl, cycloalkyl, aryl, aralkyl or alkaryl radical which may be unsubstituted or substituted by alkyl radicals or heteroatom-containing groups or may be interrupted by heteroatoms;
b) water or another solvent which is suitable for dissolving, dispersing, suspending or emulsifying the polymer (component A), as component B;
c) optionally, surface-active compounds, dispersants, suspending media and/or emulsifiers, as component C,
i) at least one metal oxide and/or metal salt as component I,
j) if required, at least one complexing agent as component J,
k) if required, at least one acid or one alkali metal salt or alkaline earth metal salt of the corresponding acid as component K,
l) if required, further additives as component L,
wherein the polymer (component A) is prepared by polycondensation, wherein the following components are reacted with one another:
(1) at least one aldehyde as component Aa,
(2) at least one aromatic compound which carries at least one CM group or one sulfo group, —SO₂OM, or both groups, as component Ab,
(3) optionally at least on compound selected from diphenols or polyphenols having vicinal OM groups, it being possible, if required, for the vicinal OH groups to be protected as acetal or ketal, as component Ac, and
(4) at least one amino compound as component Ad,
and where, in components Ab and Ac, M, in each case independently of one another, are hydrogen or a cation, or a divalent or polyvalent cation, if negative charges sufficient for compensation are present.

3. A process for the treatment of a metal surface, wherein the metal surface is brought into contact with a composition for the treatment of metal surfaces, containing
a) at least one polymer as component A, composed of
a structural element (1),
at least three structural elements selected from the group consisting of structural elements (2), (4), and (5), and optionally further structural element(s) (3),
wherein the structural elements 1-5 are represented by the following formulas

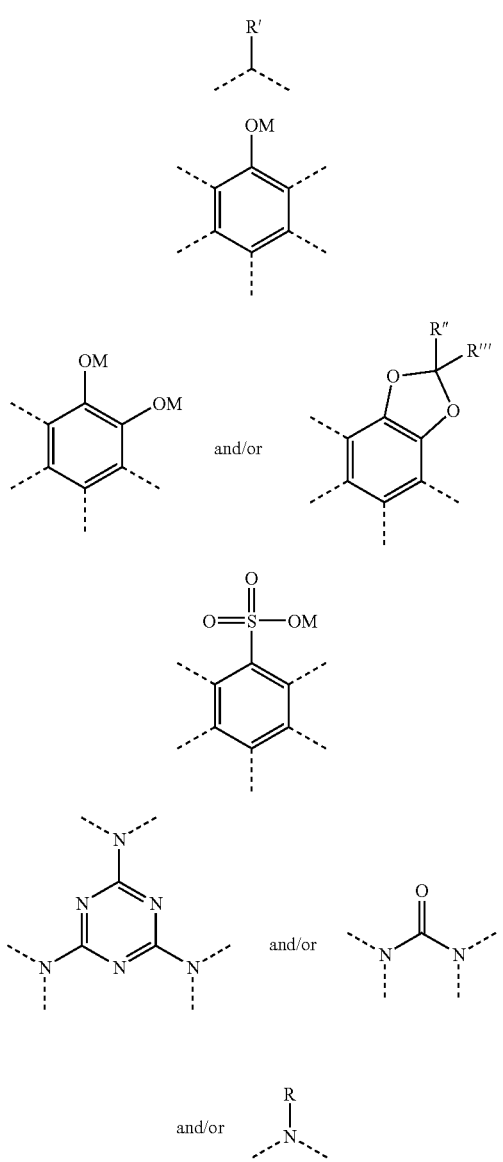

where
in structural element (1), R' is hydrogen or an alkyl, cycloalkyl, aryl, aralkyl or alkaryl radical of less than 31 carbon atoms which may be unsubstituted or substituted by alkyl radicals or heteroatom-containing groups or may be interrupted by heteroatoms or may contain double bonds;
in structural element (3), R" and R''' are any desired radicals having a molecular weight of <200 g/mol,
in structural elements (2), (3) and (4), M, in each case independently of one another, are hydrogen or a cation, and
in structural element (5), R is hydrogen or an alkyl, cycloalkyl, aryl, aralkyl or alkaryl radical which may be unsubstituted or substituted by alkyl radicals or heteroatom-containing groups or may be interrupted by heteroatoms;
b) water or another solvent which is suitable for dissolving, dispersing, suspending or emulsifying the polymer (component A), as component B;
c) optionally, surface-active compounds, dispersants, suspending media and/or emulsifiers, as component C,
wherein the polymer (component A) is prepared by polycondensation, wherein the following components are reacted with one another:
  (1) at least one aldehyde as component Aa,
  (2) at least one aromatic compound which carries at least one OM group or one sulfo group, —SO₂OM, or both groups, as component Ab,
  (3) optionally at least on compound selected from diphenols or polyphenols having vicinal OM groups, it being possible, if required, for the vicinal OH groups to be protected as acetal or ketal, as component Ac, and
  (4) at least one amino compound as component Ad,
and where, in components Ab and Ac, M, in each case independently of one another, are hydrogen or a cation, or a divalent or polyvalent cation, if negative charges sufficient for compensation are present.

4. A process as claimed in claim 3, comprising the steps:
a) if required, cleaning of the metal surface for removing oils, greases and dirt,
b) if required, washing with water,
c) if required, pickling in order to remove rust or other oxides, in the presence or absence of the polymer (component A) used according to the invention,
d) if required, washing with water,
e) treatment of the metal surface in the presence of the polymer (component A) used according to the invention,
f) if required, washing with water,
g) if required, aftertreatment, in the presence or absence of the polymer (component A) used according to the invention.

5. A process for the treatment of a metal surface, wherein the metal surface is brought into contact with a composition for the deposition of metals or metal alloys on plastics surfaces, containing:
a) at least one polymer as component A, composed of
  a structural element (1),
  at least three structural elements selected from the group consisting of structural elements (2), (4), and (5),
  and optionally further structural element(s) (3),
  wherein the structural elements 1-5 are represented by the following formulas

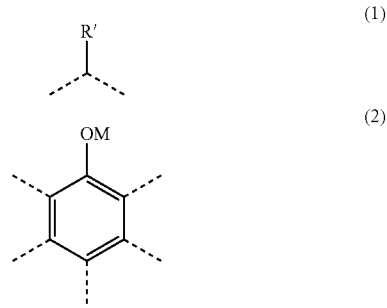

-continued

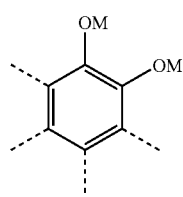 and/or 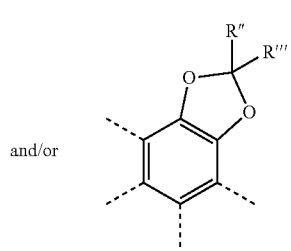

(3)

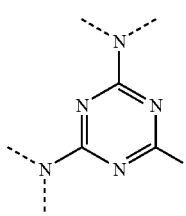

(4)

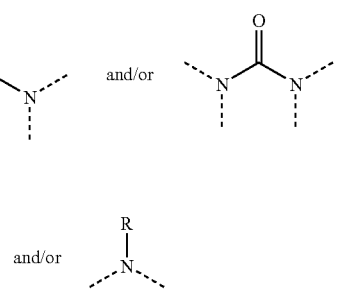 and/or 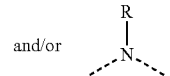

(5)

where
- in structural element (1), R' is hydrogen or an alkyl, cycloalkyl, aryl, aralkyl or alkaryl radical of less than 31 carbon atoms which may be unsubstituted or substituted by alkyl radicals or heteroatom-containing groups or may be interrupted by heteroatoms or may contain double bonds;
- in structural element (3), R'' and R''' are any desired radicals having a molecular weight of <200 g/mol,
- in structural elements (2), (3) and (4), M, in each case independently of one another, are hydrogen or a cation, and
- in structural element (5), R is hydrogen or an alkyl, cycloalkyl, aryl, aralkyl or alkaryl radical which may be unsubstituted or substituted by alkyl radicals or heteroatom-containing groups or may be interrupted by heteroatoms;

b) water or another solvent which is suitable for dissolving, dispersing, suspending or emulsifying the polymer (component A), as component B;

c) optionally, surface-active compounds, dispersants, suspending media and/or emulsifiers, as component C, wherein the polymer (component A) is prepared by polycondensation, wherein the following components are reacted with one another:
(1) at least one aldehyde as component Aa,
(2) at least one aromatic compound which carries at least one OM group or one sulfo group, —SO₂OM, or both groups, as component Ab,
(3) optionally at least on compound selected from diphenols or polyphenols having vicinal OM groups, it being possible, if required, for the vicinal OH groups to be protected as acetal or ketal, as component Ac, and
(4) at least one amino compound as component Ad, and where, in components Ab and Ac, M, in each case independently of one another, are hydrogen or a cation, or a divalent or polyvalent cation, if negative charges sufficient for compensation are present.

6. A process for the deposition of metals or metal alloys on a plastics surface, wherein the plastics surface is brought into contact with a composition for the deposition of metals or metal alloys on plastics surfaces, containing:
a) at least one polymer as component A, composed of
a structural element (1),
at least three structural elements selected from the group consisting of structural elements (2), (4), and (5),
and optionally further structural element(s) (3),
wherein the structural elements 1-5 are represented by the following formulas

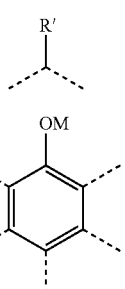

(1)

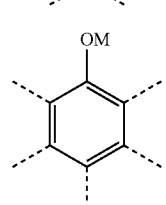

(2)

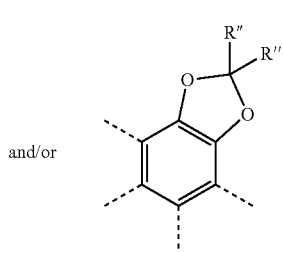

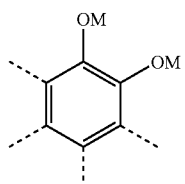 and/or (3)

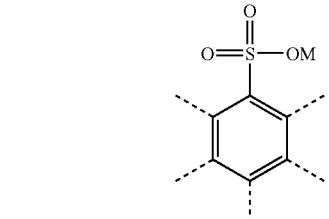

(4)

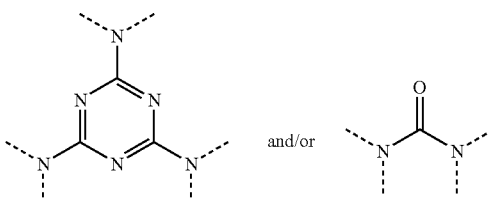 and/or (5)

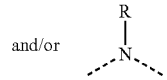 and/or where
in structural element (1), R' is hydrogen or an alkyl, cycloalkyl, aryl, aralkyl or alkaryl radical of less than 31 carbon atoms which may be unsubstituted or substituted by alkyl radicals or heteroatom-containing groups or may be interrupted by heteroatoms or may contain double bonds;

in structural element (3), R" and R'" are any desired radicals having a molecular weight of <200 g/mol, in structural elements (2), (3) and (4), M, in each case independently of one another, are hydrogen or a cation, and in structural element (5), R is hydrogen or an alkyl, cycloalkyl, aryl, aralkyl or alkaryl radical which may be unsubstituted or substituted by alkyl radicals or heteroatom-containing groups or may be interrupted by heteroatoms;

b) water or another solvent which is suitable for dissolving, dispersing, suspending or emulsifying the polymer (component A), as component B;

c) optionally, surface-active compounds, dispersants, suspending media and/or emulsifiers, as component C, wherein the polymer (component A) is prepared by polycondensation, wherein the following components are reacted with one another:

(1) at least one aldehyde as component Aa, (2) at least one aromatic compound which carries at least one OM group or one sulfo group, —SO$_2$OM, or both groups, as component Ab, (3) optionally at least on compound selected from diphenols or polyphenols having vicinal OM groups, it being possible, if required, for the vicinal OH groups to be protected as acetal or ketal, as component Ac, and (4) at least one amino compound as component Ad, and where, in components Ab and Ac, M, in each case independently of one another, are hydrogen or a cation, or a divalent or polyvalent cation, if negative charges sufficient for compensation are present.

7. A process as claimed in claim 5, wherein a chemical or electrochemical metal deposition is carried out.

8. A composition for the deposition of metals or metal alloys on plastics surfaces, containing:

a) at least one polymer as component A, composed of
a structural element (1),
at least three structural elements selected from the group consisting of structural elements (2), (4), and (5), and optionally further structural element(s) (3),
wherein the structural elements 1-5 are represented by the following formulas

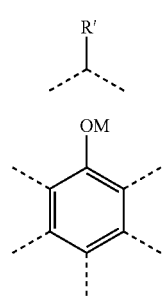

-continued

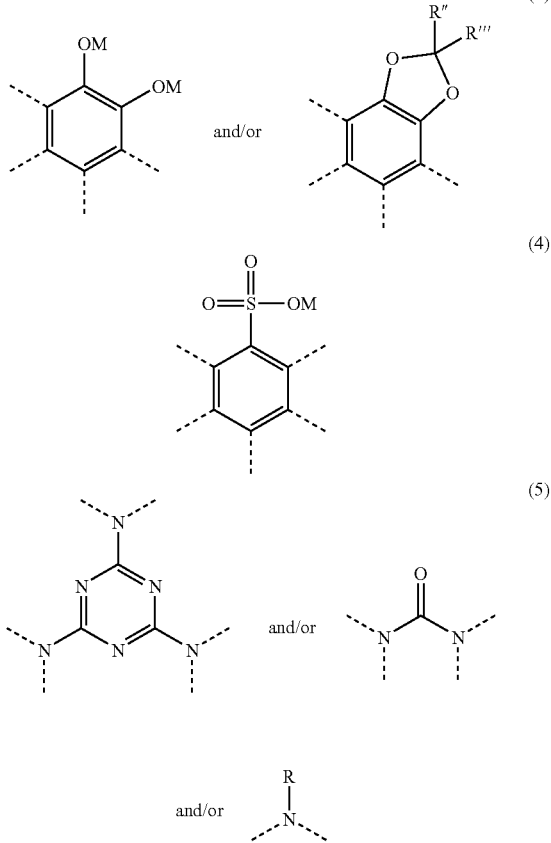

where
in structural element (1), R' is hydrogen or an alkyl, cycloalkyl, aryl, aralkyl or alkaryl radical of less than 31 carbon atoms which may be unsubstituted or substituted by alkyl radicals or heteroatom-containing groups or may be interrupted by heteroatoms or may contain double bonds; in structural element (3), R" and R'" are any desired radicals having a molecular weight of <200 g/mol, in structural elements (2), (3) and (4), M, in each case independently of one another, are hydrogen or a cation, and in structural element (5), R is hydrogen or an alkyl, cycloalkyl, aryl, aralkyl or alkaryl radical which may be unsubstituted or substituted by alkyl radicals or heteroatom-containing groups or may be interrupted by heteroatoms;

b) water or another solvent which is suitable for dissolving, dispersing, suspending or emulsifying the polymer (component A), as component B;

c) optionally, surface-active compounds, dispersants, suspending media and/or emulsifiers, as component C, i) at least one metal oxide and/or metal salt as component I, j) if required, at least one complexing agent as component J, k) if required, at least one acid or one alkali metal salt or alkaline earth metal salt of the corresponding acid as component K, l) if required, further additives as component L, wherein the polymer (component A) is prepared by polycondensation, wherein the following components are reacted with one another:
(1) at least one aldehyde as component Aa,
(2) at least one aromatic compound which carries at least one CM group or one sulfo group, —$SO_2OM$, or both groups, as component Ab,
(3) optionally at least on compound selected from diphenols or polyphenols having vicinal CM groups, it being possible, if required, for the vicinal OH groups to be protected as acetal or ketal, as component Ac, and
(4) at least one amino compound as component Ad,
and where, in components Ab and Ac, M, in each case independently of one another, are hydrogen or a cation, or a divalent or polyvalent cation, if negative charges sufficient for compensation are present.

* * * * *